(12) United States Patent
Oshima et al.

(10) Patent No.: US 11,807,154 B2
(45) Date of Patent: Nov. 7, 2023

(54) ROTATION ADJUSTMENT MECHANISM AND HEADLIGHT DEVICE

(71) Applicant: Mitsubishi Electric Corporation, Tokyo (JP)

(72) Inventors: Ritsuya Oshima, Tokyo (JP); Takeshi Inatani, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 60 days.

(21) Appl. No.: 17/911,701

(22) PCT Filed: Mar. 31, 2020

(86) PCT No.: PCT/JP2020/014773
§ 371 (c)(1),
(2) Date: Sep. 15, 2022

(87) PCT Pub. No.: WO2021/199257
PCT Pub. Date: Oct. 7, 2021

(65) Prior Publication Data
US 2023/0122607 A1    Apr. 20, 2023

(51) Int. Cl.
*F21S 41/657* (2018.01)
*B60Q 1/076* (2006.01)
*F21S 41/25* (2018.01)
*F21S 41/147* (2018.01)

(52) U.S. Cl.
CPC .............. *B60Q 1/076* (2013.01); *F21S 41/147* (2018.01); *F21S 41/25* (2018.01); *B60Q 2200/30* (2013.01)

(58) Field of Classification Search
None
See application file for complete search history.

(56) References Cited

U.S. PATENT DOCUMENTS

| | | | |
|---|---|---|---|
| 2006/0092653 A1 | 5/2006 | Tachiiwa et al. | |
| 2008/0112181 A1 | 5/2008 | Tatara et al. | |
| (Continued) | | | |

FOREIGN PATENT DOCUMENTS

| | | |
|---|---|---|
| CN | 101363584 A | 2/2009 |
| CN | 102139659 A | 8/2011 |
| CN | 104061512 A | 9/2014 |
| DE | 102005031773 A1 | 2/2007 |
| (Continued) | | |

OTHER PUBLICATIONS

International Search Report and Written Opinion mailed on Jun. 16, 2020, received for PCT Application PCT/ JP2020/014773, filed on Mar. 31, 2020, 10 pages including English Translation.
(Continued)

*Primary Examiner* — Elmito Breval
(74) *Attorney, Agent, or Firm* — XSENSUS LLP

(57) ABSTRACT

A rotation adjustment mechanism includes a rotation target module supported to be freely rotatable with respect to a fixation member around a first rotary shaft and an adjustment unit including a slider. Rotation of the rotation target module around the first rotary shaft is regulated by a contact point where a connection groove of the rotation target module and a projection part of the slider contact each other, and a shape of a surface of the connection groove contacting the projection part is a shape formed by a locus that successively connects the contact points of the connection groove and the projection part each of which is obtained each time the rotation target module is moved around the first rotary shaft by a unit angle and simultaneously the projection part fixed to the slider is translated by a constant amount in a direction parallel to the slide axis.

9 Claims, 19 Drawing Sheets

(56) References Cited

U.S. PATENT DOCUMENTS

| | | |
|---|---|---|
| 2011/0133646 A1 | 6/2011 | Nakazawa et al. |
| 2011/0188258 A1 | 8/2011 | Tajima |
| 2014/0286692 A1 | 9/2014 | Kondo |

FOREIGN PATENT DOCUMENTS

| | | | |
|---|---|---|---|
| EP | 1455100 | A1 | 9/2004 |
| EP | 2 484 555 | A1 | 8/2012 |
| JP | 10-21706 | A | 1/1998 |
| JP | 11-51143 | A | 2/1999 |
| JP | 2004-330906 | A | 11/2004 |
| JP | 2006-131022 | A | 5/2006 |
| JP | 2006-193144 | A | 7/2006 |
| JP | 2008-51551 | A | 3/2008 |
| JP | 2008-123855 | A | 5/2008 |
| JP | 2011-39159 | A | 2/2011 |
| JP | 2011-121386 | A | 6/2011 |
| JP | 2012-245933 | A | 12/2012 |
| JP | 5700818 | B2 | 4/2015 |
| WO | 2021/199262 | A1 | 5/2021 |

OTHER PUBLICATIONS

Chinese Office Action issued Dec. 26, 2022, in corresponding Chinese Patent Application No. 202080098904.6.
Notice of Reasons for Refusal mailed on Jun. 14, 2022, received for JP Application 2022-512978, 11 pages including English Translation.
Office Action dated on Mar. 24, 2023, in corresponding Japanese patent Application No. 2022-512978, 9 pages.
Office Action issued on Oct. 25, 2022, in corresponding Japanese patent Application No. 2022-512978, 8 pages.

ROTATION ADJUSTMENT MECHANISM AND HEADLIGHT DEVICE

CROSS-REFERENCE TO RELATED APPLICATION

The present application is based on PCT filing PCT/JP2020/014773, filed Mar. 31, 2020, and is related to U.S. Serial No.: 17/911701, entitled: ROTATION ADJUSTMENT MECHANISM AND HEADLIGHT DEVICE, filed on: 2020-03-31, the entire contents of each which are incorporated herein by reference.

TECHNICAL FIELD

The present disclosure relates to a rotation adjustment mechanism and a headlight device including the rotation adjustment mechanism.

BACKGROUND ART

There is an optical axis adjustment mechanism that adjusts directions of an optical axis of an optical module as a rotation target module in an up/down direction and a transverse direction in a headlight device by restricting movement of the optical module by three points made up of a pivot (rotary) support, an up/down translation support and a transverse translation support and adjusting a linear movement amount at each support. For example, Patent Reference 1 describes a structure in which a bracket that restricts the movement of the optical module is held by a housing at three points made up of a spherical joint, a combination of an aiming screw and an aiming nut, and a combination of another aiming screw and another aiming nut. The movement of the optical module is restricted with respect to the bracket via a supporting point connection part to be freely rotatable around an axis in a vertical direction as a rotation axis. The direction of the optical axis of the optical module in the up/down direction is adjusted by liner movement of a motor shaft of a motor connected to a lower end of the optical module. Further, the direction of the optical axis of the optical module in the transverse direction (i.e., an inclination in a horizontal direction) can be manually adjusted by using the combinations of the aiming screw and the aiming nut of the bracket.

PRIOR ART REFERENCE

Patent Reference

Patent Reference 1: Japanese Patent No. 5700818

SUMMARY OF THE INVENTION

Problem to Be Solved by the Invention

However, in the method of adjusting the direction of the optical module by using a liner movement mechanism of an adjustment unit placed at a position apart from a rotary support part of the optical module, there is a problem in that a rotation angle of the optical module to which turning force is transmitted does not have a linear (i.e., constant) relationship with respect to a unit movement amount of the liner movement mechanism (e.g., a movement amount of one step of a stepping motor) and the direction (i.e., the rotation angle) of the optical module cannot be adjusted with high resolution.

An object of the present disclosure, which has been made to resolve the above-described problem, is to provide a rotation adjustment mechanism and a headlight device in which the rotation adjustment headlight device in which the rotation angle of the rotation target module has the linear relationship with respect to the unit movement amount of a slider of the adjustment unit and the direction of the rotation target module can be adjusted with high resolution.

Means for Solving the Problem

A rotation adjustment mechanism according to the present the rotation disclosure includes a rotation module supported to be freely rotatable with respect to a fixation member around a first rotary shaft and an adjustment unit fixed to the fixation member and including a slider movable along a slide axis pointing in a direction orthogonal to the first rotary shaft. The rotation target module includes a connection groove, the slider includes a projection part that is fitted in the connection groove of the rotation target module around the first rotary shaft is regulated by a contact point where the connection groove and the projection part contact each other, and a shape of a surface of the connection groove contacting the projection part is a shape formed by a locus that successively connects the contact points of the connection groove and the projection part each of which is obtained each time the rotation target module is moved around the first rotary shaft by a unit angle and simultaneously the projection part fixed to the slider is translated by a constant amount in a direction parallel to the slide axis.

Effect of the Invention

According to the present disclosure, the rotation angle of the rotation target module has the linear relationship with respect to the unit movement amount of the slider of the adjustment unit and the direction of the rotation target module can be adj usted with high resolut ion.

MODS FOR CARRYING OUT THE INVENTION

Figure 1:
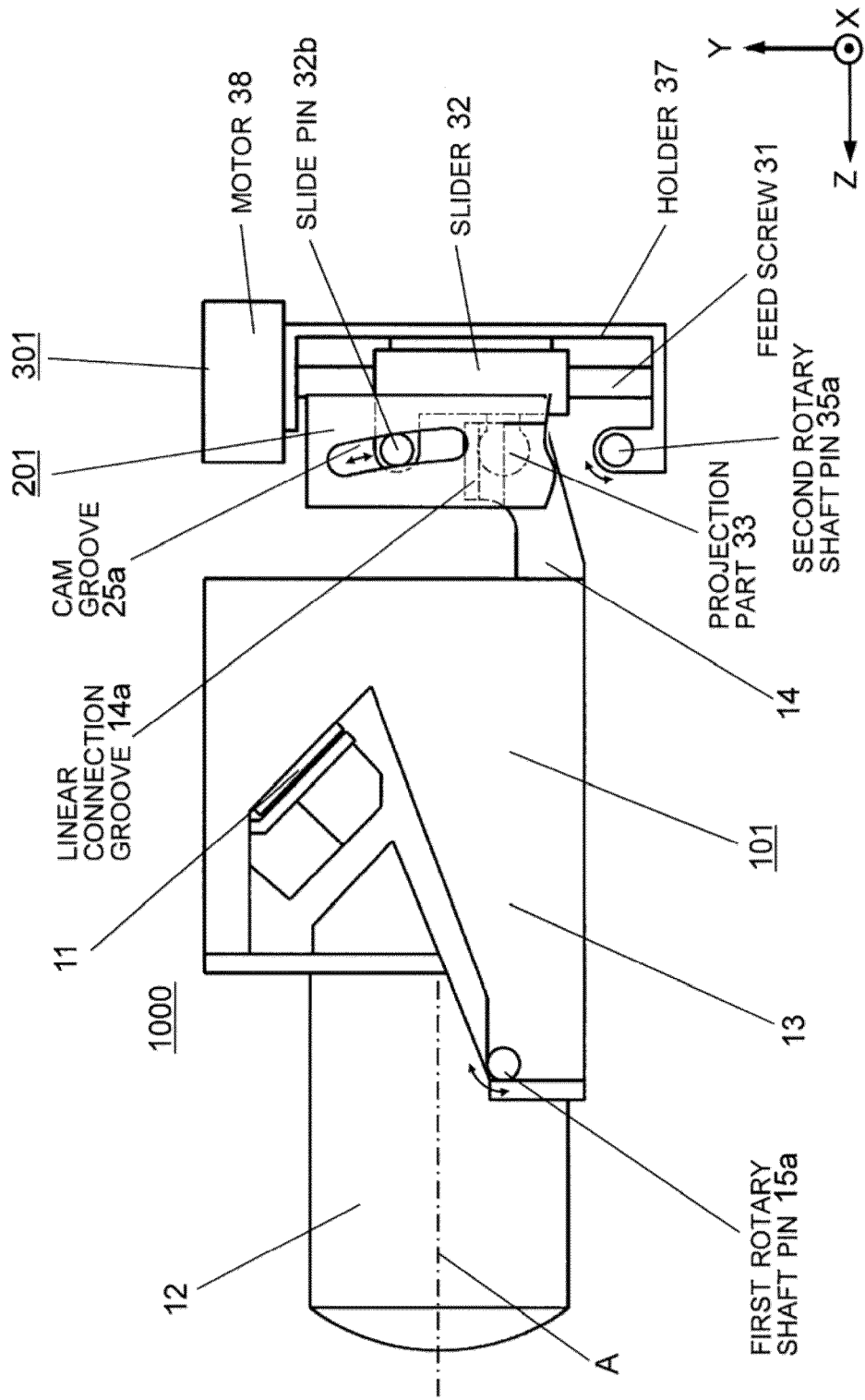
FIG. 1 is a side view schematically showing the structure of a headlight device according to a first embodiment.

A rotation adjustment mechanism and a headlight device according to each embodiment will be described below with reference to the drawings. The following embodiments are just examples and it is possible to appropriately combine embodiments and appropriately modify each embodiment. In the drawings, similar components are assigned the same reference character.

Coordinate axes of an XYZ orthogonal coordinate system are indicated in the drawings. A forward direction of the headlight device equipped with the rotation adjustment mechanism is defined as a +Z-axis direction, and a rearward direction is defined as a -Z-axis direction. The forward direction of the headlight device is the direction in which illuminating light is emitted. An upward direction of the headlight device shown in the drawings is defined as a +Y-axis direction, and a downward direction is defined as a -Y-axis direction. As facing the forward direction of the headlight device (+Z-axis direction), the left side of the headlight device is assumed to be in a +X-azis direction, and the right side of the headlight device is assumed to be in a -X-axis direction. In the following embodiments, light emitted from a light source section is emitted in the +Z-axis direction, for example.

Optical axis adjustment of the headlight device around the X-axis means adjusting the direction of the optical axis of the headlight device between an obliquely upward direction and an obliquely downward direction. The optical axis adjustment of the headlight device around the X-axis is used mainly when correcting an optical axis misalignment caused by attachment displacement of the headlight device with respect to the vehicle body and inclination of the vehicle body when traveling.

When the optical module of the headlight device has been attached to the body of the vehicle with an inclination around the X-axis, there is a problem in that optimum light distribution by the headlight device cannot be obtained. Further, in this case, a problem can occur such as causing dazzlement to the driver of an oncoming vehicle due to the light emitted from the optical module. The "dazzlement" means disturbing the vision of a person. The "dazzlement" means that the light emitted from the optical module of the headlight device of the host vehicle enters the eyes of the driver of the oncoming vehicle and disturbs the driving by the driver of the oncoming vehicle. Therefore, the optical axis adjustment is executed by use of an adjustment unit so as to correct the inclination of the optical axis of the optical module with respect to the vehicle body around the X-axis.

On the other hand, when a person is seated on the rear seat of the vehicle, the vehicle body inclines rearward. Further, the vehicle body inclines rearward also when luggage or the like is loaded on the rear seat or in the rear trunk. Furthermore, the vehicle body inclines rearward when the vehicle accelerates, and decelerates, the vehicle body inclines forward when the vehicle decelerates. Here, to "incline" means to incline due to rotation of the vehicle body around an axis of wheels of the vehicle. Also in this case, the adjustment of the inclination of the optical axis of the optical module around the X-axis (i.e., the optical axis adjustment) is executed by use of the adjustment unit. A control circuit (not shown) as a control section for controlling the operation of the rotation adjustment mechanism is attached to the vehicle body, for example, and is capable of making the adjustment unit automatically execute the optical axis adjustment of the optical module based on the result of detection by an inclination sensor that detects the inclination of the vehicle body. Further, the adjustment unit is capable of executing the optical axis adjustment of the optical module according to operations performed on a user operation section such as a switch for controlling the operation of the rotation adjustment mechanism.

First Embodiment

Figure 2:
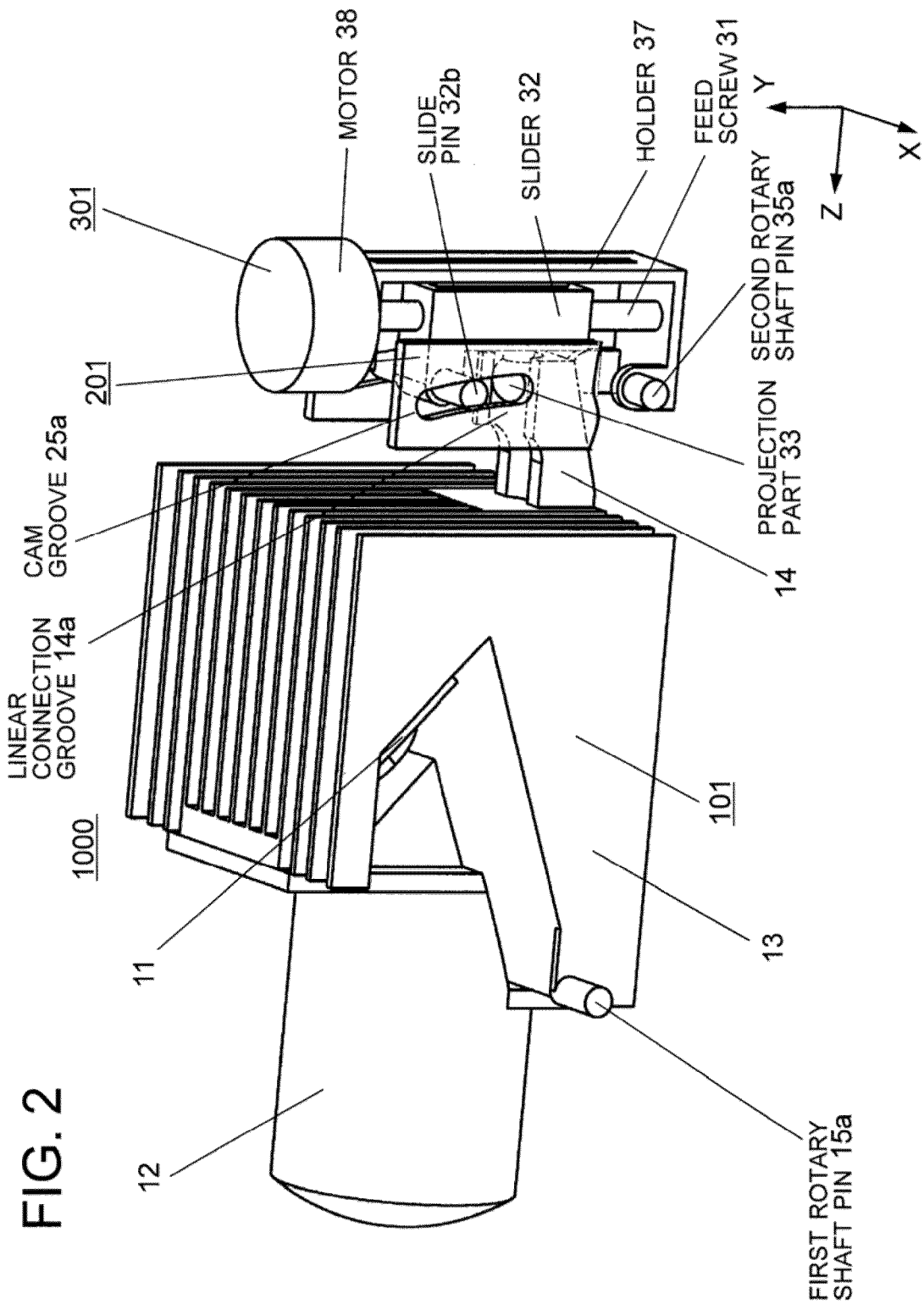
FIG. 2 is a perspective view schematically showing the structure of the headlight device according to the first embodiment.
Figure 3:
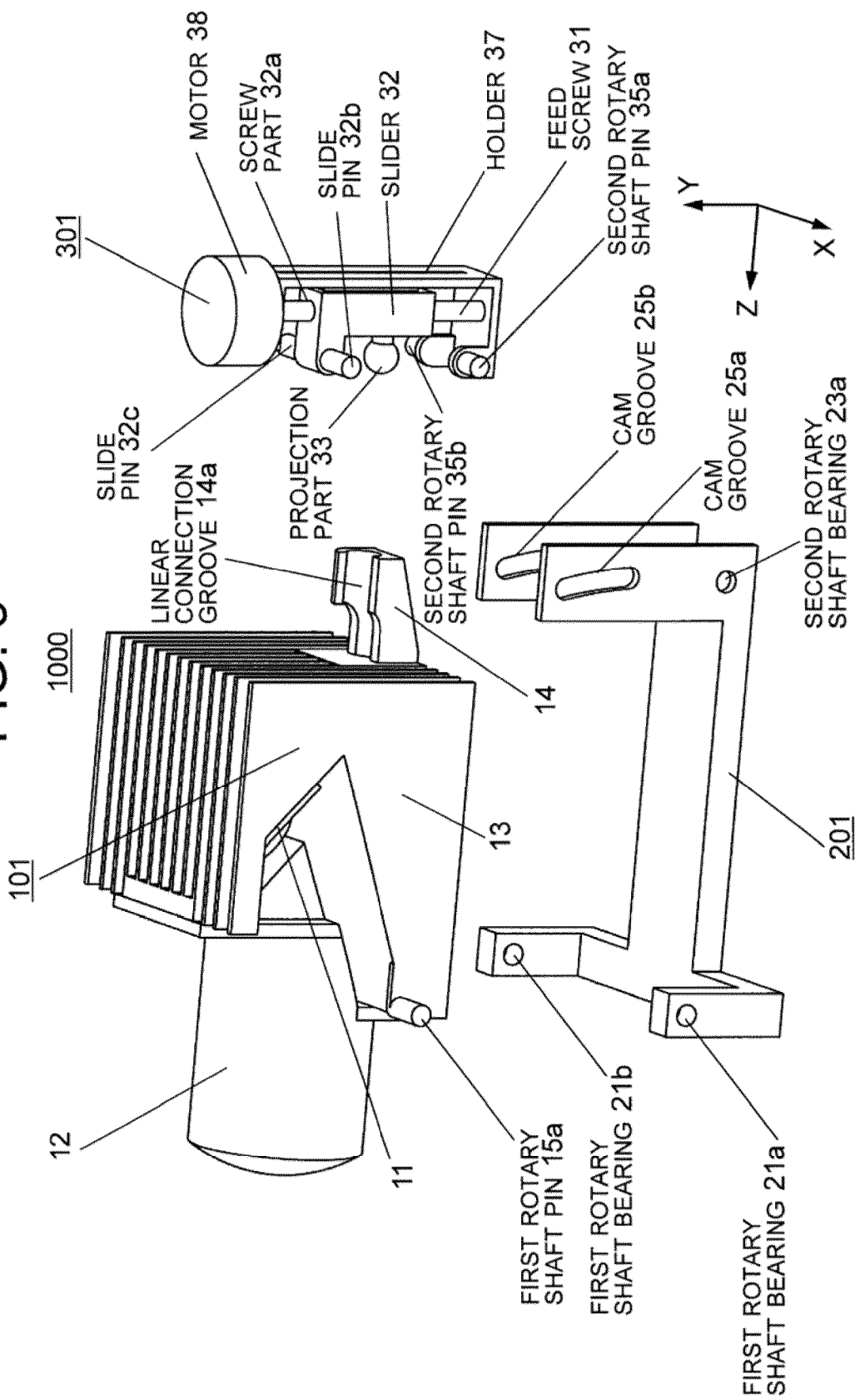
FIG. 3 is an exploded perspective view schematically showing the structure of the headlight device according to the first embodiment.

FIG. 1 is a side view schematically showing the structure of a headlight device 1000 according to a first embodiment. FIG. 2 is a perspective view schematically showing the structure of the headlight device 1000. FIG. 3 is an exploded perspective view schematically showing the structure of the headlight device 1000. The headlight device 1000 includes an optical module 101 as a rotation target module, a fixation member 201, and an adjustment unit 301. The headlight device 1000 includes a rotation adjustment mechanism. The rotation adjustment mechanism includes the optical module 101 that is attached to the fixation member 201 to be freely rotatable around the X-axis and the adjustment unit 301 that is attached to the fixation member 201 to be freely rotatable around attached to the fixation the X-axis, connected to the optical module 101, and rotates the optical module 101 around the X-axis.

The optical module 101 includes a light source section 11, an optical member 12, a holding member 13 and a connection member 14, for example. The light source section 11, the optical member 12 and the connection member 14 are attached to the holding member 13. However, the structure of the optical module 101 is not limited to that shown in the drawings.

The light source section 11 emits light. The light source section 11 includes a solid-state light source, for example. The light source section 11 is held by the holding member 13. The optical member 12 allows the light emitted from the light source section 11 to pass through and reflects the light to project the light forward (substantially in the +Z-axis direction). The optical member 12 includes a projection lens, for example. The optical axis of the optical member 12 is represented as an optical axis A.

The holding member 13 is capable of supporting the light source section 11 and the optical member 12. The holding member 13 has a function as a heat radiator, for example. Heat generated in the light source section 11 is efficiently diffused by the holding member 13 and an excessive temperature rise of the light source section 11 is inhibited.

On its end faces in regard to the transverse direction (±X-axis directions), the holding member 13 includes first rotary shaft pins 15a and 15b constituting a first rotary shaft 15. The first rotary shaft pin 15b (not shown) projecting in the -X-axis direction is coaxial with the first rotary shaft pin 15a projecting in the +X-axis direction. Namely, the first rotary shaft pins 15a and 15b coaxial with each other project towards sides opposite to each other.

The holding member 13 includes the connection member 14 on its rear surface in regard to a longitudinal direction (±Z-axis directions). The connection member 14 is provided with a linear connection groove 14a extending linearly. The linear connection groove 14a in this example is a groove in a linear shape extending in a direction (e.g., ±Z-axis direction) orthogonal to the first More specifically, the linear connection groove rotary shaft 5. More y, 14a is a groove in a linear shape extending in a direction parallel to a straight line orthogonal to the first rotary shaft 15 and connecting the first rotary shaft 15 and one point on a locus of a be described later. It is projection partwhich will permissible, for example, if the linear connection groove 14a is a groove in a linear shape extending in a direction parallel to a straight line orthogonal to the first rotary shaft 15 and connecting the first rotary shaft 15 and the projection part 33 in a state in which the optical module 101 and the adjustment unit 301 are connected to each other.

As shown in FIG. 3, the adjustment unit 301 includes a holder 37, a feed screw 31, a motor 313 and a slider 32, for example. The feed screw 31, the slider 32 and the motor 38 constitute a rectilinear traveling mechanism that makes the slider 32 travel straight along the feed screw 31.

The feed screw 31 is axially supported by the holder 37 to be rotatable around the Y-axis. A rotary output shaft of the motor 38 is connected to the feed screw 31 so as to transmit rotary drive force of the motor 38 to the feed screw 31. A main body part of the motor 38 is fixed to the holder 37. A screw part 32a (i.e., screw hole) is provided in a central part of the slider 32 and is engaged with the feed screw 31 so that the slider 32 can translate in the ±Y-axis directions in response to rotation of the feed screw 31 around the Y-axis.

On its end faces in regard to the transverse direction (±X-axis directions), the slider 32 includes slide pins 32b and 32c as slide members that engage with (contact) cam grooves 25a and 25b as cam members which will be described later. The slide pin 32b is a pin provided on the +X-axis side of the slider 32 and having an axis parallel to the X-axis. The slide pin 32c coaxial with the slide pin 32b is provided on the -X-axis side of the slider 32. The projection part 33 whose tip end is in a spherical shape is formed integrally with the slider 32. The projection part 33 is fitted in the linear connection groove 14a provided on the connection member 14 of the optical module 101.

The holder 37 is attached to the fixation member 201 to be freely rotatable around a second rotary shaft 35 (shown in FIG. 6 which will be explained later). In this example, the holder 37 includes second rotary shaft pins 35a and 35b constituting the second rotary shaft 35 on its end faces in regard to the transverse direction (±X-axis directions). The second rotary shaft pin 35a is a pin provided on the +X-axis side of the holder 37 and having an axis parallel to the X-axis. The second rotary shaft pin 35b coaxial with the second rotary shaft pin 35a is provided on the -X-axis side of the holder 37.

As shown in FIG. 3, the fixation member 201 includes first rotary shaft bearings 21a and 21b, second rotary shaft bearings 23a and 23b (23b is not shown), and the cam grooves 25a and 25b as the cam members that regulate the movement of the adjustment unit 301, for example. Incidentally, only a part of the fixation member 201 is shown in FIG. 1 and FIG. 2.

The first rotary shaft bearing 21a is a shaft hole that is provided on the +x-axis side of the fixation member 201 and is parallel to the X-axis. The first rotary shaft bearing 21b is a shaft hole that is provided on the -X-axis side of the fixation member 201 and is coaxial with the first rotary shaft bearing 21a. The first rotary shaft bearings 21a and 21b respectively axially support the first rotary shaft pins 15a and 15b provided on the holding member 13. With this configuration, the optical module 101 is supported to be freely rotatable with respect to the fixation member 201 around the X-axis.

The second rotary shaft bearing 23a is a shaft hole that is provided on the +X-axis side of the fixation member 201 and is parallel to the X-axis. The second rotary shaft bearing 23b coaxial with the second rotary shaft bearing 23a is provided on the -X-axis side of the fixation member 201. The second rotary shaft bearings 23a and 23b respectively axially support the second rotary shaft pins 35a and 35b provided on the adjustment unit 301 (more specifically, the holder 37 included in the adjustment unit 301). With this configuration, the adjustment unit 301 is supported to be freely rotatable with respect to the fixation member 201 around the X-axis, centering at the second rotary shaft 35 (shown in FIG. 6 which will be explained later), situated at a position different from the first rotary shaft 15 (shown in FIG. 6 which will be explained later), as the rotation center.

The cam groove 25a is provided on the +X-axis side of the fixation member 201, while the cam groove 25b is provided on the -X-axis side of the fixation member 201. The cam grooves 25a and 25b face each other. The cam grooves 25a and 25b respectively engage with the slide pins 32b and 32c provided on the adjustment unit 301.

Figure 4:
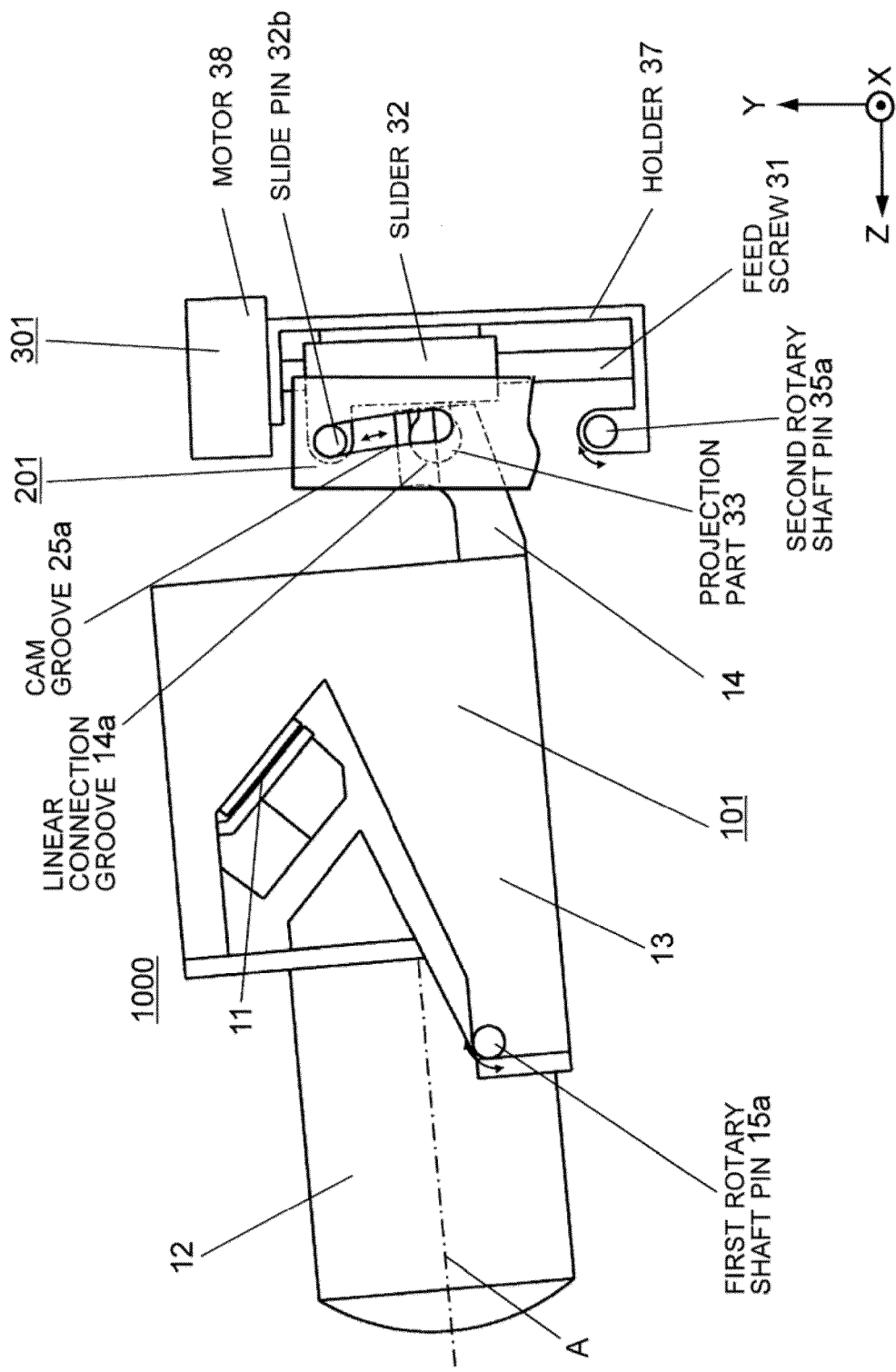
FIG. 4 is a side view (No. 1) showing the operation of the headlight device according to the first embodiment.
Figure 5:
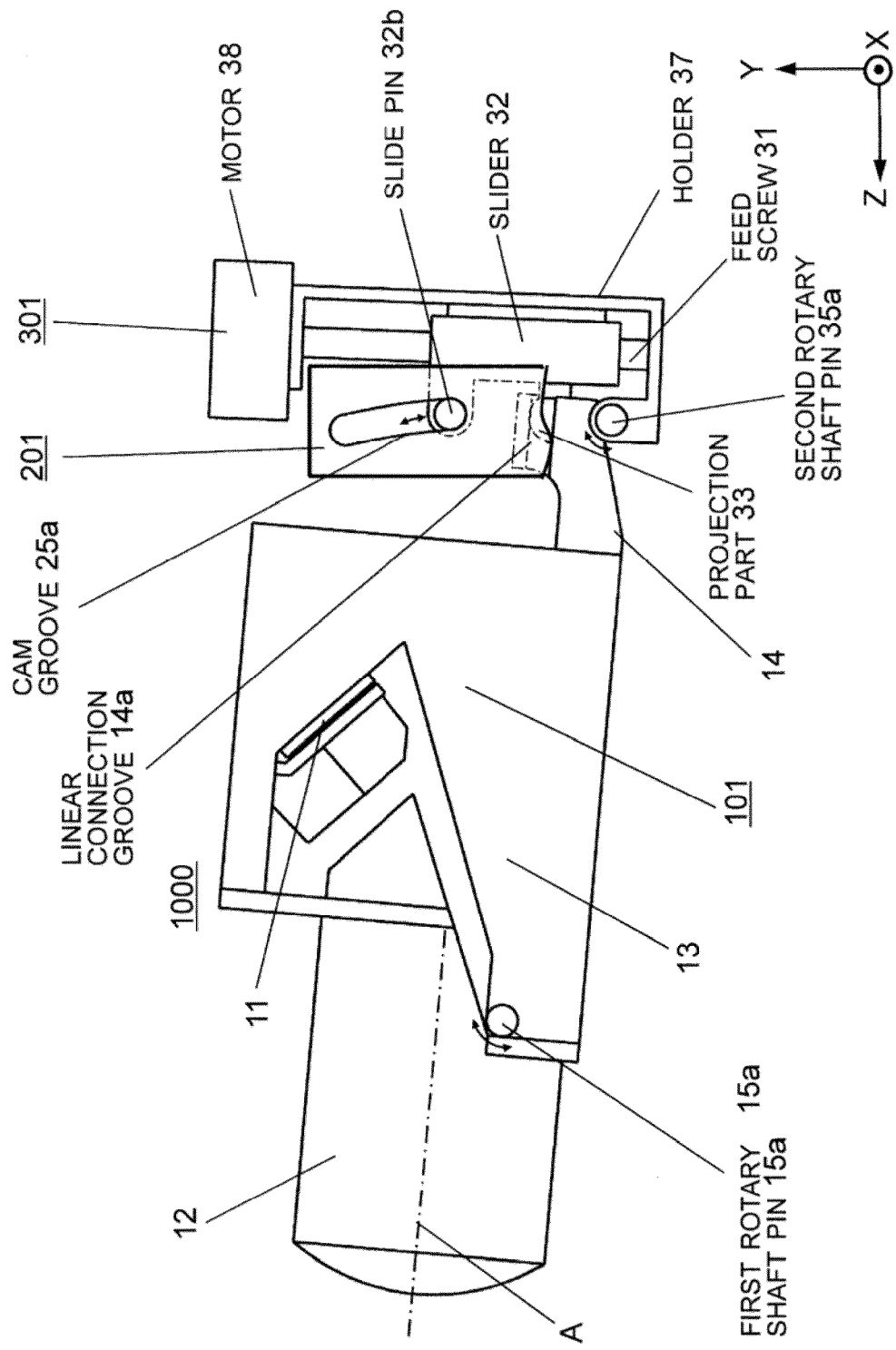
FIG. 5 is a side view (No. 2) showing the operation of the headlight device according to the first embodiment.

FIG. 4 and FIG. 5 are side views (No. 1 and No. 2) showing the operation of the headlight device 1000. Incidentally, only a part of the fixation member 201 is shown in FIG. 4 and FIG. 5. When the feed screw 31 driven by the motor 38 rotates around the Y-axis in FIG. 1 and accordingly the slider 32 moves in the +Y-axis direction or the -Y-axis direction, for example, the slide pins 32b and 32c fixed to the slider 32 move substantially in the +Y-axis direction as the upward direction or in the -Y-axis direction as the downward direction while engaging with the cam grooves 25a and 25b provided on the fixation member 201. According to this movement, as shown in FIG. 4, the adjustment unit 301 rotates around the X-axis (i.e., counterclockwise or clockwise) centering at the second rotary shaft 35 as the rotation center.

In the case where the cam grooves 25a and 25b are in the shape shown in FIG. 1, when the slider 32 moves substantially in the +Y-axis direction as the upward direction, the adjustment unit 301 rotates around the X-axis (i.e., counterclockwise) centering at the second rotary shaft 35 as shown in FIG. 4. In this case, the optical axis A of the optical module 101 inclines obliquely downward with reference to the +Z-axis direction as shown in FIG. 4.

Further, in the case where the cam grooves 25a and 25b are in the shape shown in FIG. 1, when the slider 32 moves substantially in the -Y-axis direction as the downward direction, the adjustment unit 301 rotates around the X-axis (i.e., clockwise) centering at the second rotary shaft 35 as shown in FIG. 5. In this case, the optical axis A of the optical module 101 inclines obliquely upward with reference to the +Z-axis direction as shown in FIG. 5.

Similarly, the feed screw 31 driven by the motor 38 rotates around the Y-axis and accordingly the slider 32 moves substantially in the +Y-axis direction (or substantially in the -Y-axis direction), the projection part 33 fixed to the slider 32 moves substantially in the +Y-axis direction as the upward direction (or substantially in the -Y-axis direction as the downward direction) while being fitted in the linear connection groove 14a provided on the connection member 14. According to this movement, the optical module 101 rotates around the X-axis centering at the first rotary shaft 15 (more specifically, a rotation axis determined by the first rotary shaft pins 15a and 15b) as the rotation center. In this example, a contact point where the linear connection groove 14a and the projection part 33 contact each other rotates around the first rotary shaft 15.

For example, when the slider 32 moves substantially in the +Y-axis direction as the upward direction, the optical module 101 rotates around the X-axis (i.e., counterclockwise in FIG. 4) centering at the first rotary shaft 15 as shown in FIG. 4. Further, for example, when the slider 32 moves substantially in the -Y-axis direction as the downward direction, the optical module 101 rotates around the X-axis (i.e., clockwise in FIG. 5) centering at the first rotary shaft 15 as shown in FIG. 5.

An inclination amount (i.e., rotation angle) of the optical module 101 around the X-axis centering at the first rotary shaft 15 is determined by a Y-coordinate position and a Z-coordinate position of a sphere center (e.g., position 33b, 33c, 33d or 33e shown in FIG. 6 which will be explained later) of the projection part 33 provided on the slider 32. Further, the Y-coordinate position and the Z-coordinate position of the shere center of the projection part 33 are determined by a translation amount of the slider 32 in the Y-axis direction and an inclination amount of the adjustment unit 301 at that time around the X-axis centering at the second rotary shaft 35. Here, the rotation of the adjustment unit 301 around the X-axis centering at the second rotary shaft 35 is regulated by the cam grooves 25a and 25b that regulate the rotation by translation positions in two directions (the Y-axis direction and the Z-axis direction in this example) orthogonal to the second rotary shaft 35 of the adjustment unit 301 and orthogonal to each other. Therefore, the inclination amount of the adjustment unit 301 around the X-axis centering at the second rotary shaft 35 is regulated by a cam operat ion in which the slide pins 32b and 32c fixed to the slider 32 move along the cam grooves 25a and 25b provided on the fixation member 201. Namely, the inclination amount of the adjustment unit 301 around the X-axis centering at the second rotary shaft 35 with respect to the translation amount of the slider 32 in the Y-axis direction can be set arbitrarily by adjusting the cam shape of the cam grooves 25a and 25b.

Figure 6:
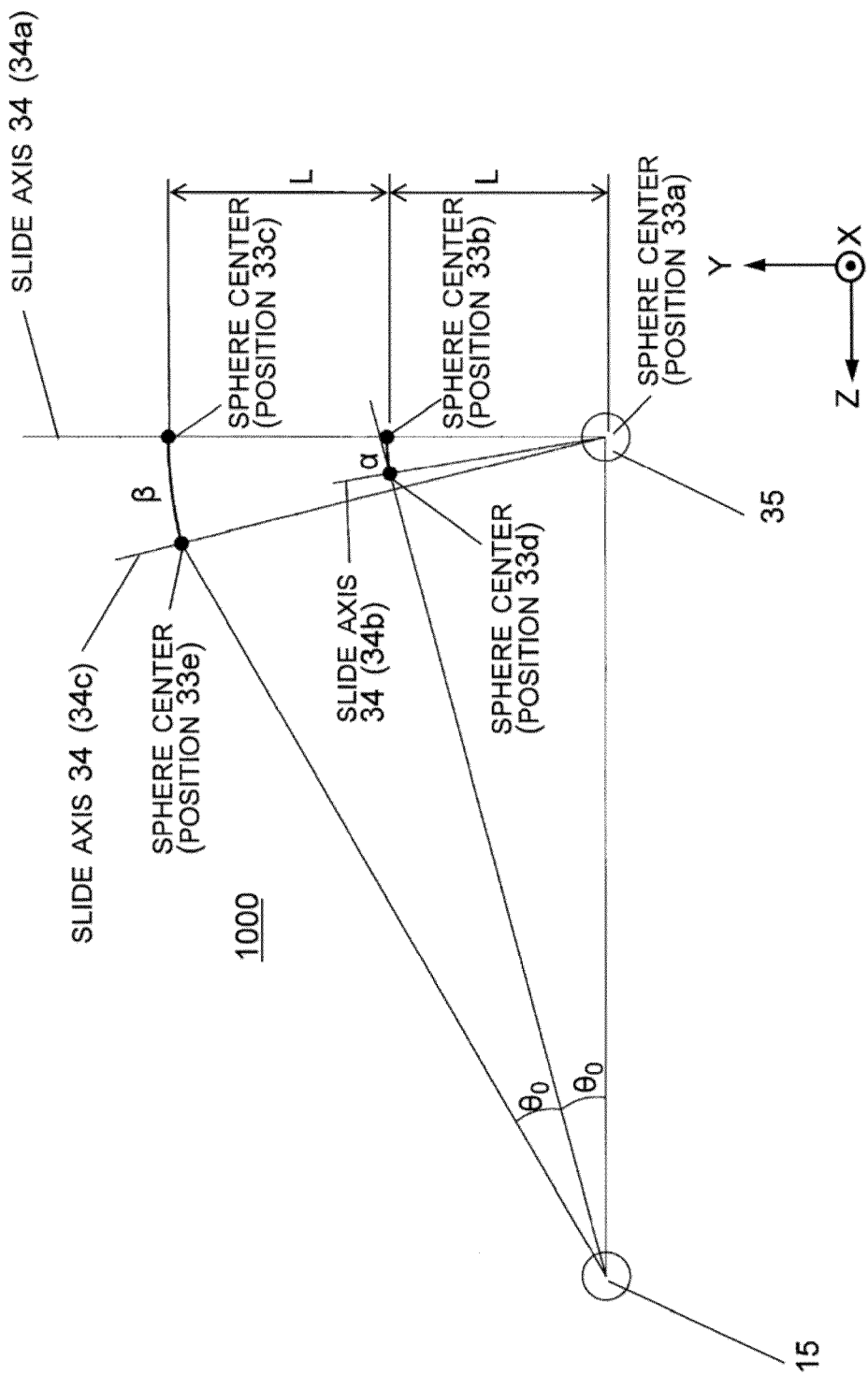
FIG. 6 is a schematic diagram showing a relationship between rotation of an optical module and rotation of an adjustment unit in the headlight, device according to the first embodiment.

FIG. 6 is a schematic diagram showing a relationship between the rotation of the optical module 101 and the rotation of the adjustment unit 301 in the headlight device 1000. When the inclination amount of the optical module 101 around the X-axis centering at the first rotary shaft 15 with respect to a constant translation amount of the slider 32 in a slide axis 34 direction (i.e., substantially in the Y-axis direction) is made constant (namely, when the translation amount and the inclination amount are in a linear relationship, the groove shape of the cam grooves 25a and 25b may be set as an arc-like shape that maintains constant an angular movement amount (i.e., rotation angle) of the contact point where the linear connection groove 14a and the projection part 33 contact each other around the first rotary shaft 15 with respect to a unit movement amount of the slider 32 in the slide axis 34 direction. Incidentally, it is desirable if the cam grooves 25a and 25b as the cam members have guide surfaces in arc-like shapes that regulate the rotation of the adjustment unit 301 around the second rotary shaft by the translation positions in the two directions (Y, Z) orthogonal to the second rotary shaft and orthogonal to each other. In this example, an inner peripheral surface and an outer peripheral surface of each cam groove 25a, 25b in arc-like shapes correspond to the guide surfaces. Also in other subsequent embodiments, a description regarding the groove shape of the cam grooves can be paraphrased as a description of the shapes of the guide surfaces of the cam members. For example, as shown in FIG. 6, the groove shape of the cam grooves 25a and 25b is formed so that the sphere center of the projection part 33 moves to the positions 33a, 33b, 33c, 33d and 33e.

FIG. 6 shows a positional relationship among the first rotary shaft 15, the second rotary shaft 35, the slide axis 34 and the sphere center of the projection part 33 in the headlight device 1000 and a relationship between an angle $\theta_0$ as a rotation angle of 101and angles α and β as rotation angles of the adjustment unit 301. Here, the inclination of the optical module 101 is represented by a line segment connecting the first rotary shaft 15 and the sphere center of the projection part 33, and the inclination of the adjustment unit 301 is represented by a line segment connecting the second rotary shaft 35 and the sphere center of the projection part 33.

In FIG. 6, when the sphere center of the projection part 33 is at the position 33a, the inclination of the optical module 101 is 0 (horizontal) and the inclination of the adjustment unit 301 (i.e., the inclination of the slide axis 34) is also 0 (vertical). The slide axis 34 at that time is represented as a slide axis 34a.

Next, in order to make the optical module 101 incline by a certain angle $\theta_0$ when the slider 32 (not shown in FIG. 6) moves in the +Y-axis direction by the unit movement amount L along the slide axis 34a, it is desirable if the slide axis 34a is inclined to a slide axis 34b by the angle α and the sphere center of the projection part 33 is moved from the position 33b to the position 33d. Further, in order to make the optical module 101 incline by an angle $2\theta_0$ (i.e., twice the certain angle $\theta_0$) when the slider 32 (not shown in FIG. 6) moves in the +Y-axis direction from the initial position by a movement amount 2L (i.e., twice the unit movement amount L) along the slide axis 34a, it is desirable if the slide axis 34a is inclined to a slide axis 34c by the angle β and the sphere center of the projection part 33 is moved from the position 33c to the position 33e. Namely, the inclination amount of the optical module 101 around the X-axis centering at the first rotary shaft 15 can be made constant with respect to the constant translation amount of the slider 32 in the slide axis 34 direction (i.e., substantially in the ±Y-axis direction) if the groove shape of the cam grooves 25a and 25b is configured so that the sphere center of the projection part 33 moves on a locus smoothly connecting the positions 33a, 33d and 33e. Namely, the translation amount of the slider 32 and the inclination amount of the optical module 101 can be set in a linear relationship.

As described above, the rotation angle of the optical module 101 is constant with respect to the unit movement amount L of the slider 32 of the liner movement mechanism of the adjustment unit 301 (namely, the unit movement amount L of the slider 32 and the rotation angle of the optical module 101 are linear with respect to each other), and thus the direction of the optical axis A (i.e., the rotation angle) of the optical module 101 can be adjusted with high resolution.

Further, since the connection groove of the connection member 14 of the optical module 101 is the linear connection groove 14a in the linear shape, the processing of the connection member 14 of the optical module 101 is easy.

Incidentally, while the linear connection groove 14a in the above description was a groove having a cross-sectional shape like a C-shape obtained by removing part of a cylindrical groove as a cutout, it is also possible to form the linear connection groove 14a as a cylindrical groove with no notch, and similar effects can be obtained also in that case.

Further, while the above description illustrated an example in which pin structures (the slide pins 32b and 32c, the second rotary shaft pins 35a and 35b, the first rotary shaft pins 15a and 15b, etc.) are provided on the adjustment unit 301 and the optical module 101's side and groove structures (the cam grooves 25a and 25b, the second rotary shaft bearings 23a and 23b, the first rotary shaft bearings 21a and 21b, etc.) engaging with those pin structures are provided on the fixation member 201's side, the relationship between the pins and the grooves may be reversed. For example, it is also possible to provide pin structures on the fixation member 201's side and provide groove structures on the adjustment unit 301 and the optical module 101's side. In that case, the fixation member 201 may be provided with projection parts as cam members having guide surfaces in arc-like shapes that regulate the rotation of the adjustment unit 301 around the second rotary shaft by the translation positions in the two directions (Y, Z) orthogonal to the second rotary shaft and orthogonal to each other, and the adjustment unit 301 may be provided with a pair of rollers or the like respectively as driven joints engaging with those projection parts and moving along the guide surfaces of the projection parts. Incidentally, the same goes for other embodiments.

Second Embodiment

Figure 7:
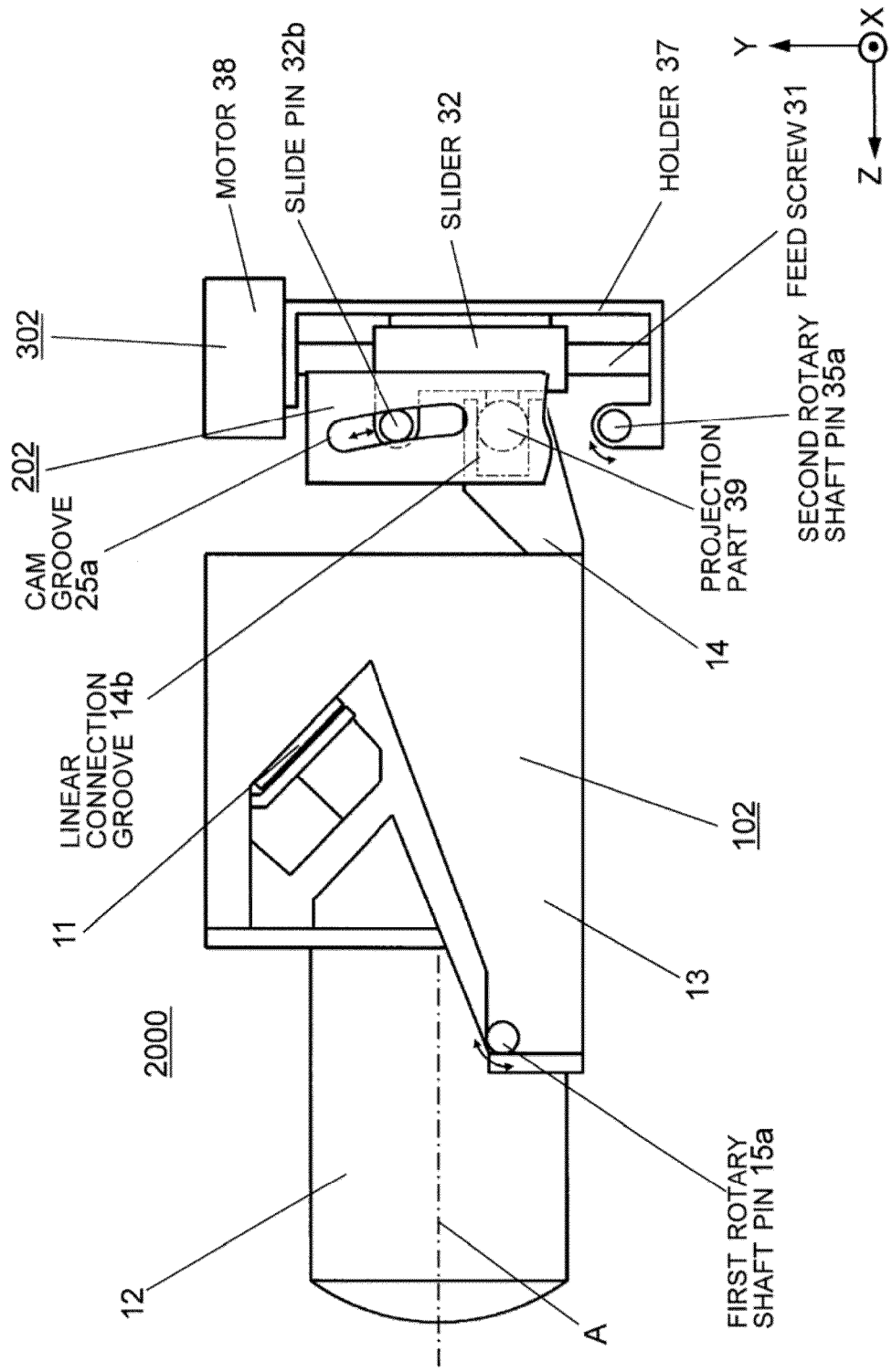
FIG. 7 is a side view schematically showing the structure of a headlight device according to a second embodiment.
Figure 8:
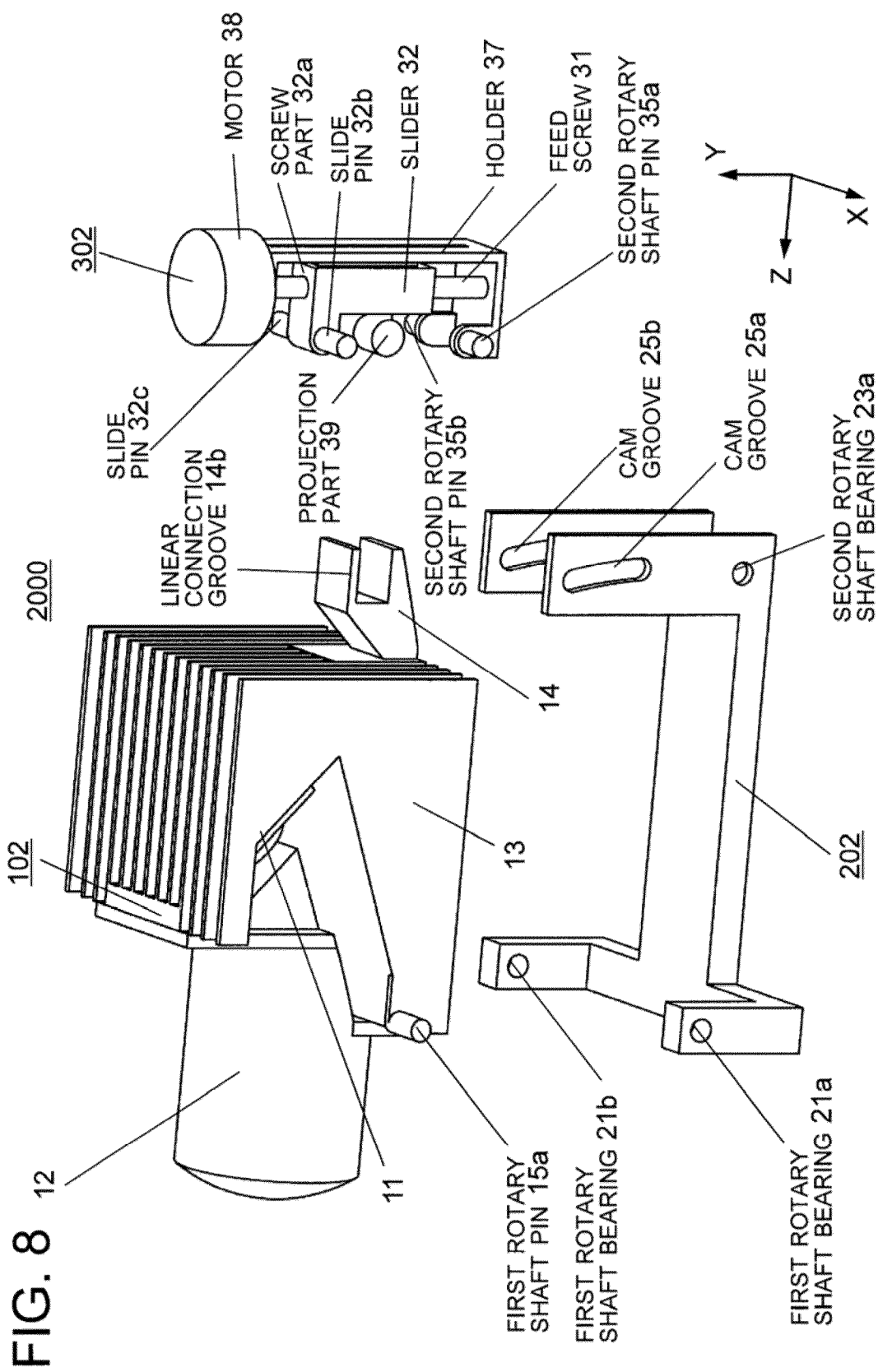
FIG. 8 is an exploded perspective view schematically showing the structure of the headlight device according to the second embodiment .

FIG. 7 is a side view schematically showing the structure of a headlight device 2000 according to a second embodiment. FIG. 8 is an exploded perspective view schematically showing the structure of the headlight device 2000. The headlight device 2000 according to the second embodiment differs from the headlight device 1000 according to the first embodiment in the shape of a linear connection groove 14b of an optical module 102 and the shape of a projection part 39 of an adjustment unit 302. Incidentally, a fixation member 202 is the same as the fixation member 201 in the first embodiment.

While the linear connection groove 14a of the optical module 101 in the first embodiment is a groove having a cross-sectional shape like a C-shape and extending linearly substantially in the ±Z-axis direction, the linear connection groove 14b of the optical module 102 in the second embodiment is a groove having a cross-sectional shape like a square U-shape and extending in the iX-axis direction. Further, while the projection part 33 of the adjustment unit 301 in the first embodiment is a spherical body that is fitted in the linear connection groove 14a to be rotatable, the projection part 39 of the adjustment unit 302 in the second embodiment is a cylindrical body that is fitted in the linear connection groove 14b to be rotatable around the X-axis and has its axial direction in the X-axis direction. As shown in FIG. 7 and FIG. 8, in the headlight device 2000, the linear connection groove 14b of the optical module 102 has two flat surfaces parallel to the XZ plane and facing each other to sandwich the projection part 39 in the up/down direction.

The headlight device 2000 according to the second embodiment operates as shown in FIG. 6 similarly to the headlight device 1000 according to the first embodiment.

As described above, the rotation angle of the optical module 102 is constant with respect to the unit movement amount L of the slider 32 of the liner movement mechanism of the adjustment unit 302 (namely, the unit movement amount L of the slider 32 and the rotation angle of the optical module 102 are linear with respect to each other), and thus the direction of the optical axis A (i.e., the rotation angle) of the optical module 102 can be adjusted with high resolution.

Further, since the connection groove of the connection member 14 of the optical module 102 is the linear connection groove 14b in the linear shape, the processing of the connection member 14 of the optical module 102 is easy.

Incidentally, except for the above-described features, the second embodiment is the same as the first embodiment.

Third Embodiment

Figure 9:
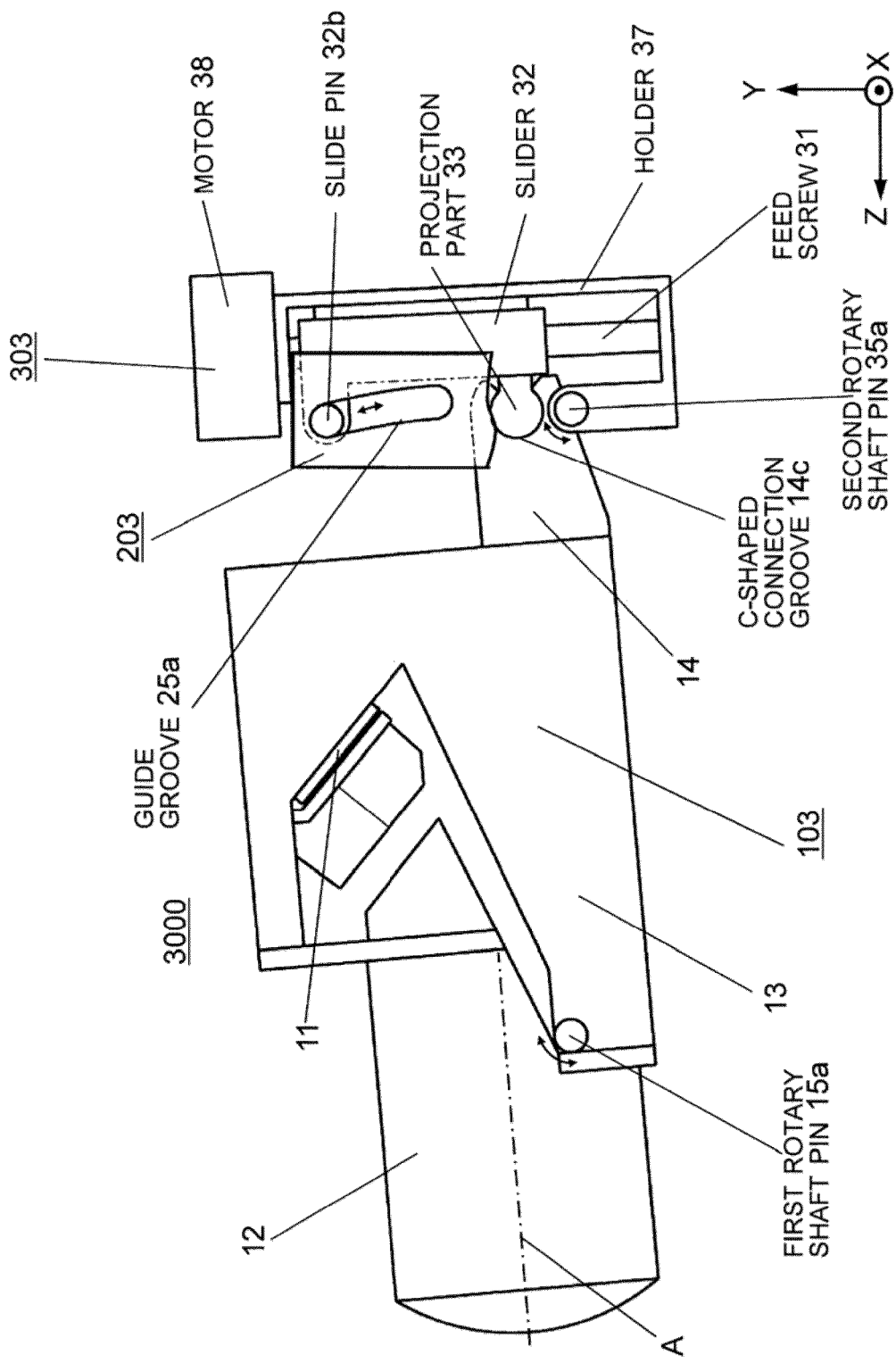
FIG. 9 is a side view schematically showing the structure of a headlight device according to a third embodiment.
Figure 10:
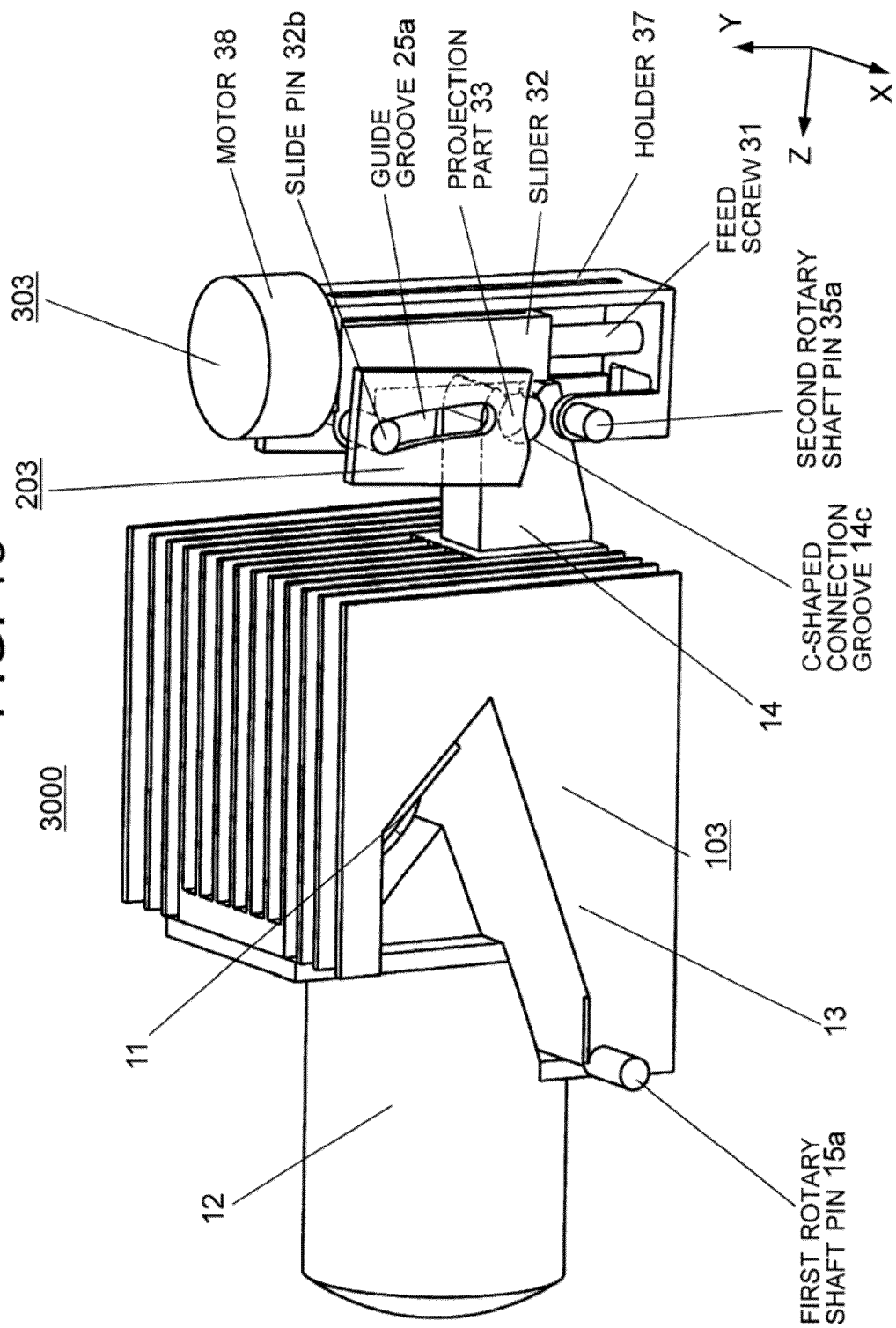
FIG. 10 is a perspective view schematically showing the structure of the headlight device according to the third embodiment.
Figure 11:
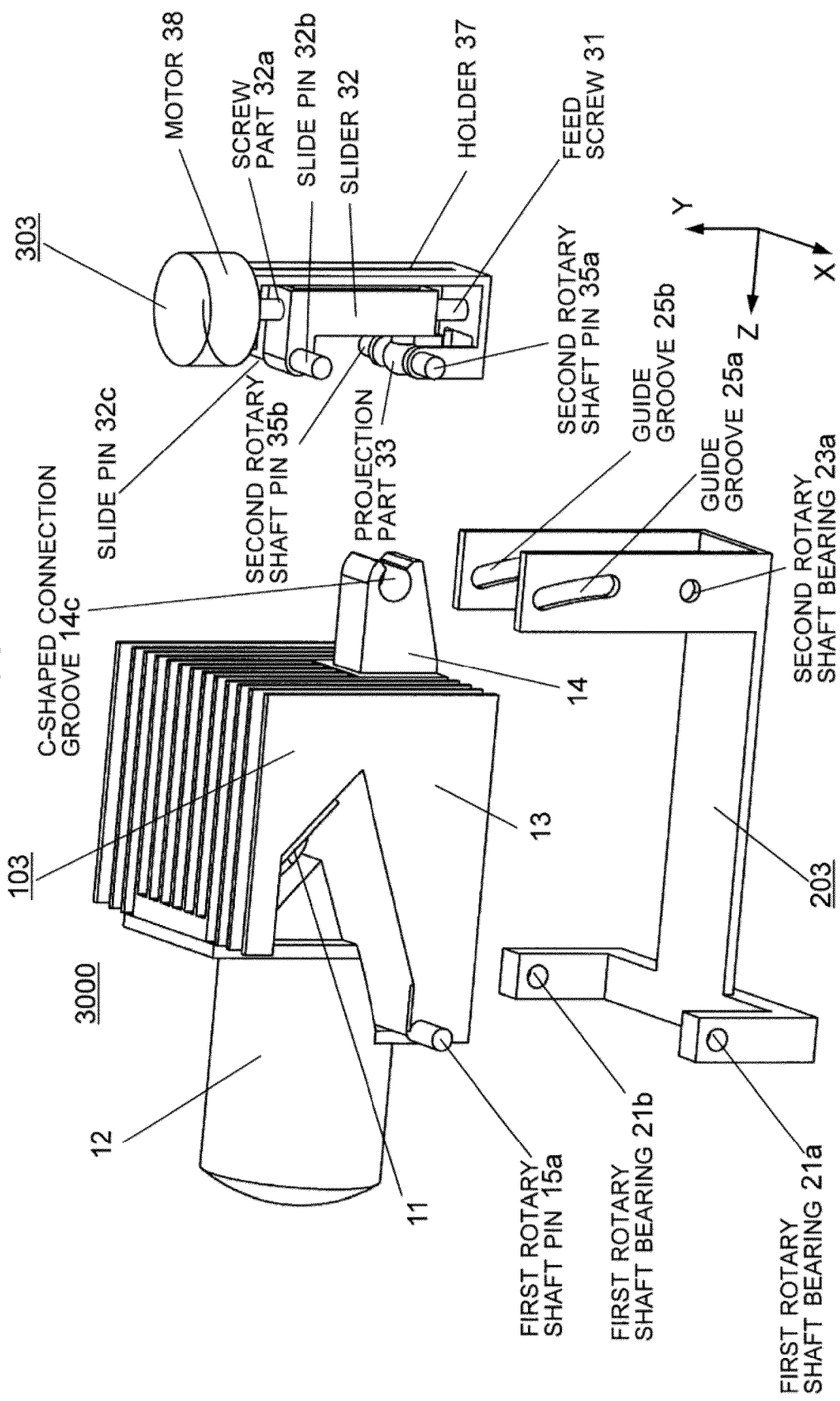
FIG. 11 is an exploded perspective view schematically showing the structure of the headlight device according to the third embodiment.

FIG. 9 is a side view schematically showing the structure of a headlight device 3000 according to a third embodiment. FIG. 10 is a perspective view schematically showing the structure of the headlight device 3000. FIG. 11 is an exploded perspective view schematically showing the structure of the headlight device 3000. The headlight device 3000 according to the third embodiment differs from the headlight device 1000 according to the first embodiment in the shape of a C-shaped connection groove 14c as the connection groove of the connection member 14 of an optical module 103 and the groove shape of the cam grooves 25a and 25b.

While the connection member 14 of the optical module 101 in the headlight device 1000 according to the first embodiment was provided with the linear connection groove 14a linearly extending in the longitudinal direction (substantially in the ±Z-axis direction), the connection member 14 of the optical module 103 in the headlight device 3000 according to the third embodiment is provided with the C-shaped connection groove 14c in the C-shape as viewed in the X-axis direction (i.e., in a side view) as shown in FIG. 9 to FIG. 11. The projection part 33 fixed to the slider 32 is a spherical body and is fitted in the C-shaped connection groove 14c. In the headlight device 3000, the groove shape of the cam grooves 25a and 25b is formed so that the sphere center of the projection part 33 moves through a locus on an arc centering at the first rotary shaft 15 (locus T shown in FIG. 12 which will be explained later).

In the third embodiment, a contact point where the C-shaped connection groove 14c and the projection part 33 contact each other moves to rotate around the first rotary shaft 15. Therefore, angles $\theta_1$ and $\theta_2$ as rotation angles of the optical module 103, to which turning force is transmitted, with respect to the unit movement amount L of the liner movement mechanism become constant by forming the groove shape of the cam grooves 25a and 25b in an arc-like shape that maintains the angles $\theta_1$ and $\theta_2$ as the rotation angles of the contact point where the C-shaped connection groove 14c and the projection part 33 contact each other around the first rotary shaft 15 constant with respect to the unit movement amount L of the slider 32 in the slide axis 34 direction. Namely, the unit movement amount L of the liner movement mechanism and the rotation angle of the optical module 103 have the linear relationship. With such a configuration, the direction of the optical axis A of the optical module 103 (i.e., the rotation angle in the up/down direction) can be adjusted with high resolution.

Figure 12:
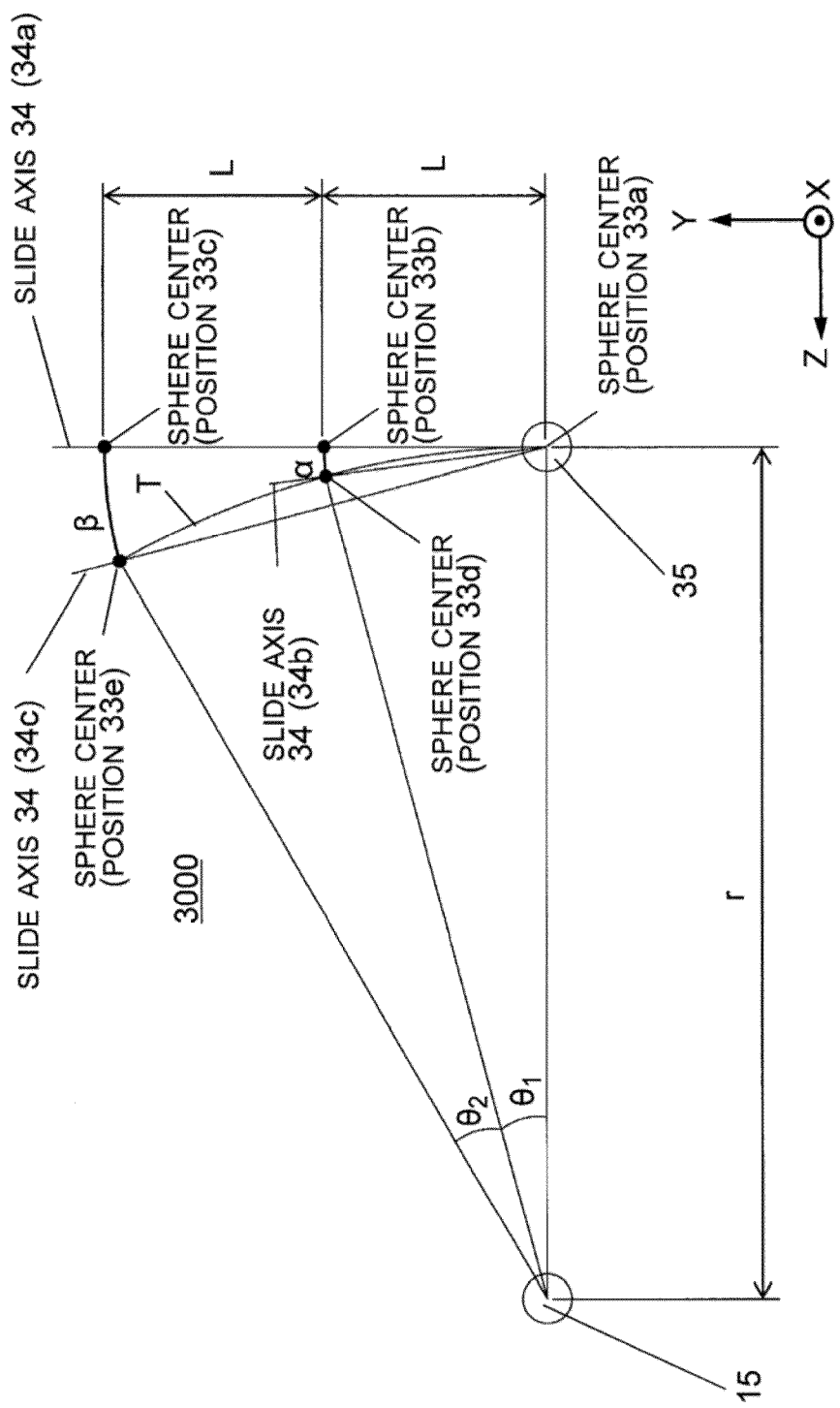
FIG. 12 is a schematic diagram showing the relationship between the rotation of the optical module and the rotation of the adjustment unit in the headlight device according to the third embodiment.

FIG. 12 is a schematic diagram showing a relationship between the rotation of the optical module 103 and the rotation of the adjustment unit 303 in the headlight device 3000 according to the third embodiment. FIG. 12 shows a positional relationship among the first rotary shaft 15 of the optical module 103 of the headlight device 3000, the second rotary shaft 35, the slide axis 34 and the sphere center of the projection part 33 and a relationship between the rotation angle of the optical module 103 and the rotation angle of the adjustment unit 303. Here, the inclination of the optical module 103 is represented by a line segment connecting the first rotary shaft 15 and the position 33d (or 33e or the like) of the sphere center of the projection part 33, and the inclination of the adjustment unit 303 is represented by a line segment connecting the second rotary shaft 35 and the position 33b (or 33c, 33d, 33e or the like) of the sphere center of the projection part 33.

In FIG. 12, when the sphere center of the projection part 33 is at the position 33a, the inclination of the optical module 103 is 0 (horizontal) and the inclination of the adjustment unit 303 (the slide axis 34a) is also 0 (vertical). Next, when the slider 32 (not shown in FIG. 12) moves in the +Y-axis direction by the unit movement amount L along the slide axis 34a, the sphere center of the projection part 33 moves from the position 33a to the position 33d whose movement amount is the unit movement amount L and is situated on the arc-like locus T centering at the first rotary shaft 15 and having a radius r connecting the first rotary shaft 15 and the second rotary shaft 35.

Further, when the slider 32 (not shown in FIG. 12) moves in the +Y-axis direction from the initial position by the movement amount 2L (i.e., twice the unit movement amount L) along the slide axis 34a, the position of the sphere center of the projection part 33 moves to the position 33e whose distance from the position 33a is the movement amount 2L and situated on the arc centering at the first rotary shaft 15 and having the radius r. As above, the groove shape of the cam grooves 25a and 25b is formed so that the sphere center of the projection part 33 moves through the locus T on the arc connecting the positions 33a, 33d and 33e and having the radius r.

In this case, the angle $\theta_1$ and the angle $\theta_2$ as the rotation angles of the optical module 103 with respect to the unit movement amount L of the slider 32 are not exactly equal to each other and the relationship between the unit movement amount L and the rotation angle of the optical module 103 is slightly nonlinear. However, the influence of the nonlinearity is negligibly small within a range of approximately ±10 degrees across a horizontal axis as a standard adjustment range of the optical axis adjustment. Therefore, the inclination amount around the X-axis centering at the first rotary shaft 15 with respect to the unit movement amount L can be made constant.

Figure 13:
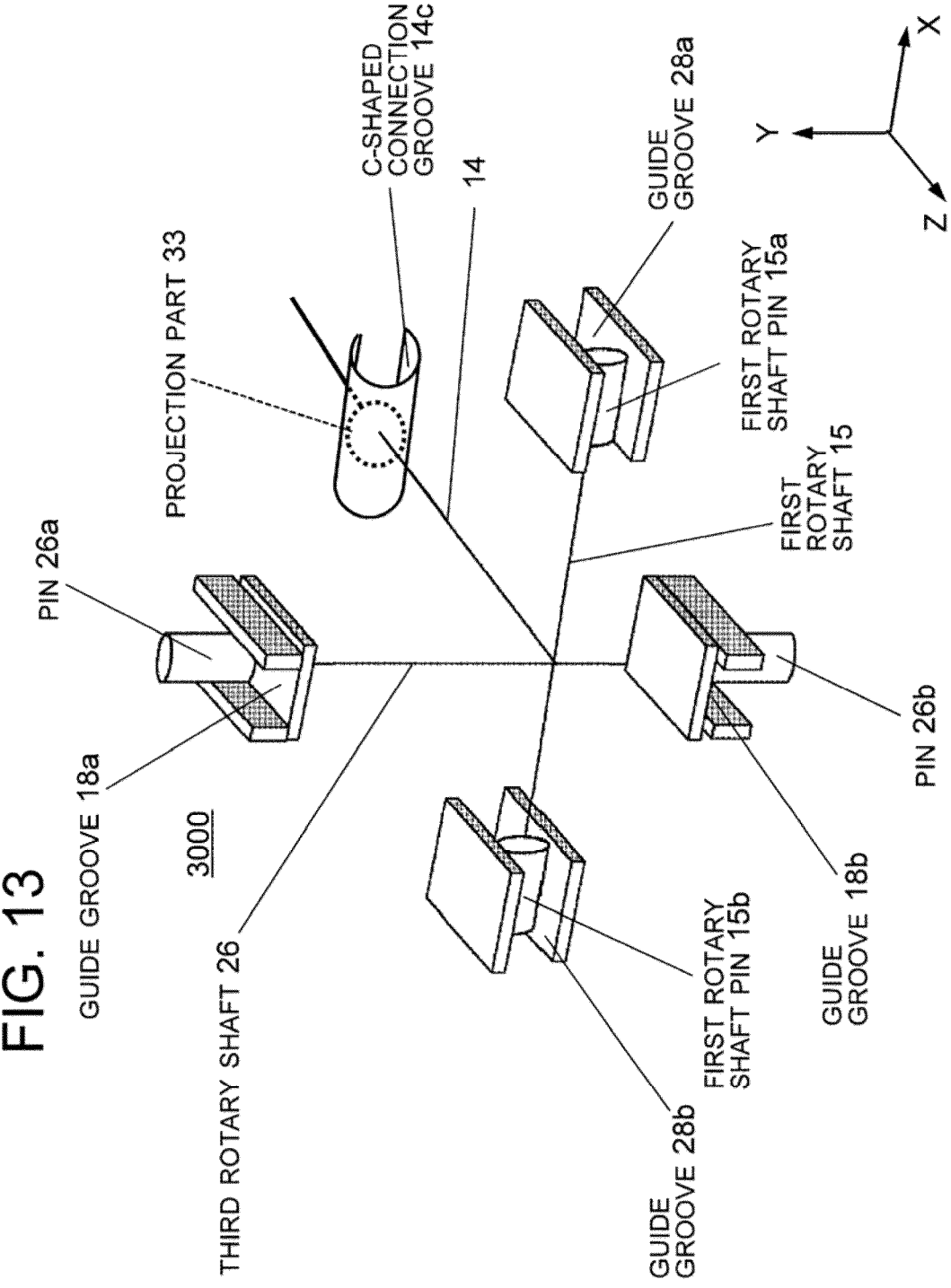
FIG. 13 is a perspective view showing another supporting method of a first rotary shaft in the headlight device according to the third embodiment.

FIG. 13 is a perspective view showing another supporting method of the first rotary shaft 15 in a headlight device 3000 according to a modification of the first embodiment. In FIG. 13, the first rotary shaft pins 15a and 15b provided on the holding member 13 of the optical module 103 are supported by guide grooves 28a and 28b parallel to the XZ plane and parallel to each other to sandwich the first rotary shaft pins 15a and 15b in the Y-axis direction. The guide grooves 28a and 28b are fixed to a fixation member 203 (shown in FIG. 11), for example. Here, the guide grooves 28a and 28b are configured not to restrict the rotation of the first rotary shaft 15 of the first rotary shaft pins 15a and 15b around the X-axis but to restrict the translation of the first rotary shaft 15 in the Y-axis direction and the rotation of the first rotary shaft 15 around the Z-axis. Put another way, the guide grooves 28a and 28b and the first rotary shaft pins 15a and 15b support the optical module 103 to be freely rotatable around the first rotary shaft 15 while restricting the translation of the optical module 103 in the Y-axis direction and the rotation of the optical module 103 around the Z-axis.

Further, the optical module 103 includes a rotary shaft 26 (a Y-shaft in the illustrated example, hereinafter referred to also as a "third rotary shaft 26") orthogonal to the first rotary shaft 15. In this example, pins 26a and 26b forming the third rotary shaft 26 are fixed to the fixation member 203 (shown in FIG. 11). Furthermore, guide grooves 18a and 18b engaging with such pins 26a and 26b are provided on the holding member 13. Here, the guide grooves 18a and 18b are configured not to restrict the rotation of the pins 26a and 26b around the third rotary shaft (Y-shaft) but to restrict the translation of the pins 26a and 26b in the X-axis direction and the rotation of the pins 26a and 26b around the Z-axis. Put another way, the guide grooves 18a and 18b and the pins 26a and 26b support the optical module 103 to be freely rotatable around the third rotary shaft 26 while restricting the translation of the optical module 103 in the X-axis direction and the rotation of the optical module 103 around the Z-axis.

For example, in the case where the holding member 13 including the first rotary shaft pins 15a and 15b and the guide grooves 18a and 18b is supported by such a configuration, the C-shaped connection groove 14c formed on the connection member 14 and the projection part 33 fitted in the C-shaped connection groove 14c do not restrict the rotation of the optical module 103 around the Y-axis, and thus the headlight device 3000 has structure in which it is also possible to make rotation adjustment of the optical module 103 in the transverse direction (i.e., around the Y-axis) in addition to the rotation adjustment around the X-axis shown with the above-described headlight device 3000.

The rotation adjustment mechanism of the headlight device 3000 is effective as an optical axis adjustment means of a headlight device for four-wheel vehicles. However, the rotation adjustment mechanism of the headlight device 3000 can also be employed for other purposes such as an illuminator for road surface lighting, guiding illumination or the like, a display device, and a rotation mechanism for rotating a module with high accuracy by using a rectilinear travel mechanism. Especially, this rotation adjustment mechanism is ideal for a rotation mechanism for a small-sized module.

Further, in the rotation adjustment mechanism of the headlight device 3000, the adjustment unit 303 is supported by the fixation member 203 to be freely rotatable with respect to the second rotary shaft 35 provided at a position different from the first rotary shaft 15, and the cam grooves 25a and 25b are provided so as to regulate the rotation of the adjustment unit 303 around the second rotary shaft 35 (more specifically, the movement of the contact point where the projection part 33 and the C-shaped connection groove 14c contact each other around the first rotary shaft 15) by translation positions in two directions orthogonal to the second rotary shaft 35 and orthogonal to each other (in this example, the Y-axis direction and the Z-axis direction). With such a configuration, downsizing can be realized especially in purposes where the installation position or a drive range in a housing is limited, such as a light fixture for a vehicle, since the arrangement of the adjustment unit 303 is not limited to the rotation around the first shaft in comparison with the configuration in which the rotary shaft of the optical module 103 (the first rotary shaft 15) and the rotary shaft of the liner movement mechanism are placed to coincide with each other and the adjustment unit 303 is mounted on the optical module 103 and made to rotate integrally therewith (in this case, the adjustment unit 303 is inclined like an arc concentric with the first rotary shaft 15). Furthermore, by supporting the adjustment unit 303 on the fixation member 203's side without mounting the adjustment unit 303 on the rotation target module on the adjusted side, weight reduction of the entire movable part is achieved and speeding up of the adjustment is facilitated.

While a pair of pins coaxially arranged to sandwich the holding member 13 as component members of a rotary shaft was illustrated in the example of FIG. 13, the configuration of the rotary shaft is not limited to this example. For example, the aforementioned rotary shaft pins may also be formed by a columnar body as one rod extending in the rotation axis direction.

Fourth Embodiment

Figure 14:
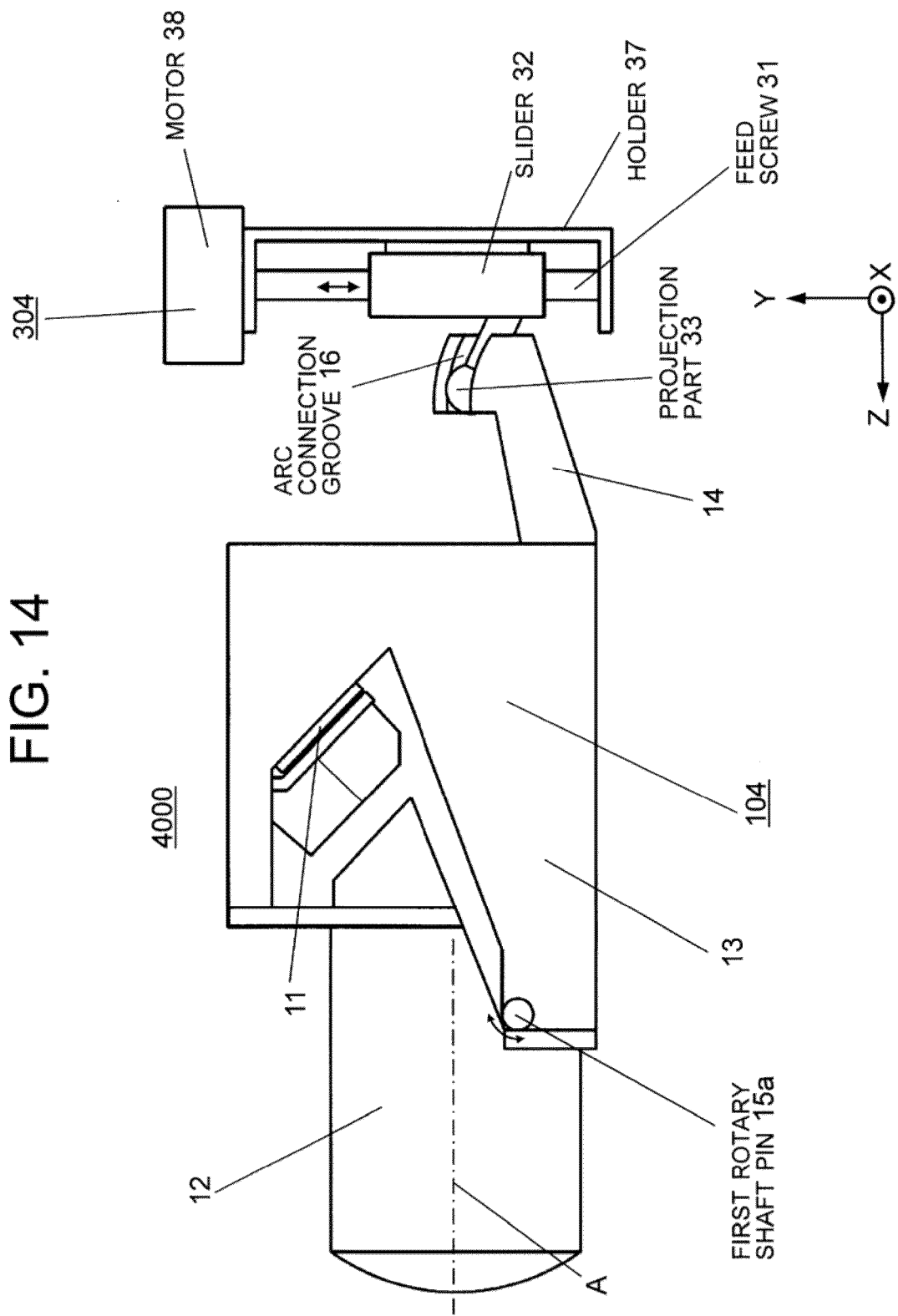
FIG. 14 is a side view schematically showing the structure of a headlight device according to a fourth embodiment.
Figure 15:
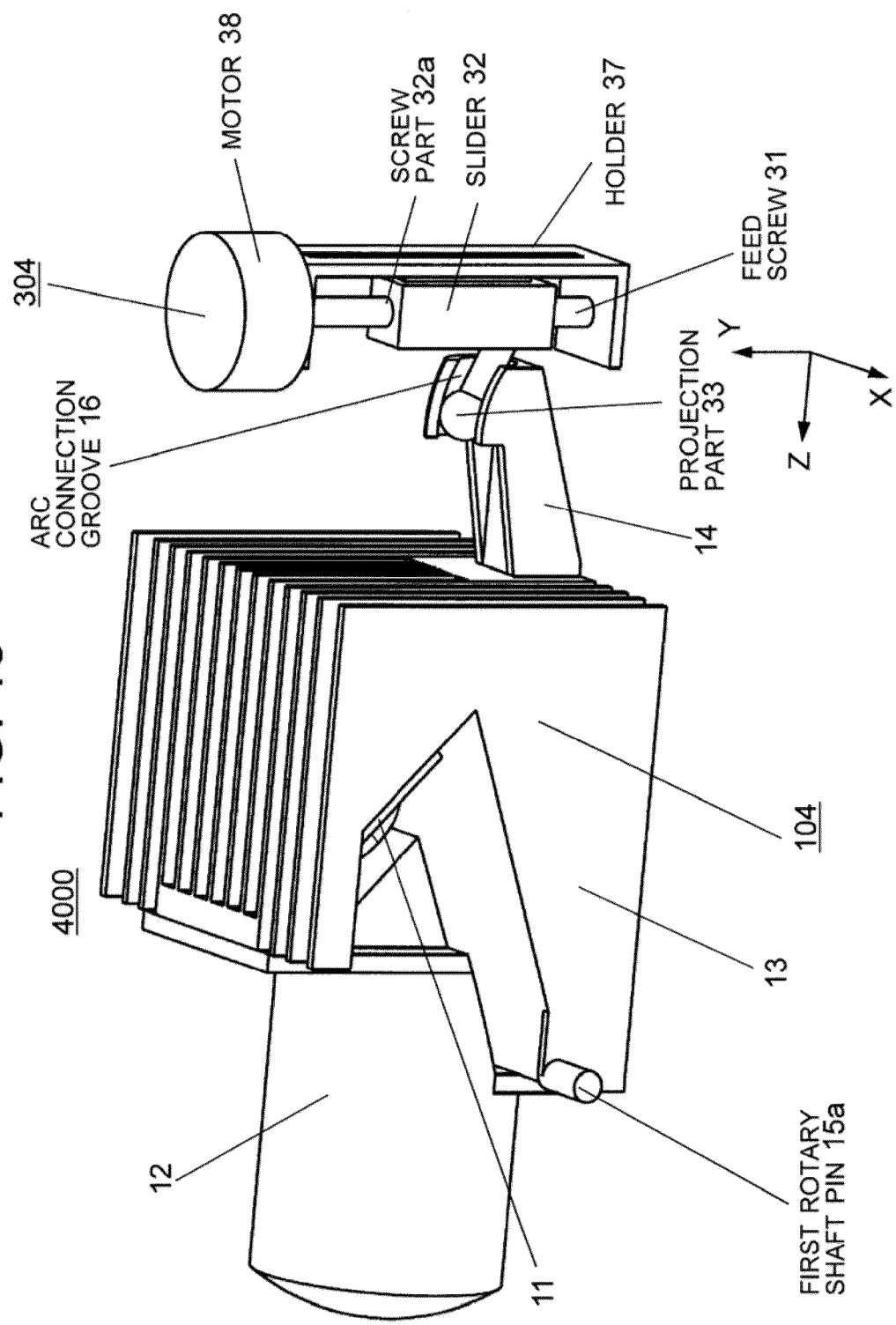
FIG. 15 is a perspective view schematically showing the structure of the headlight device according to the fourth embodiment.
Figure 16:
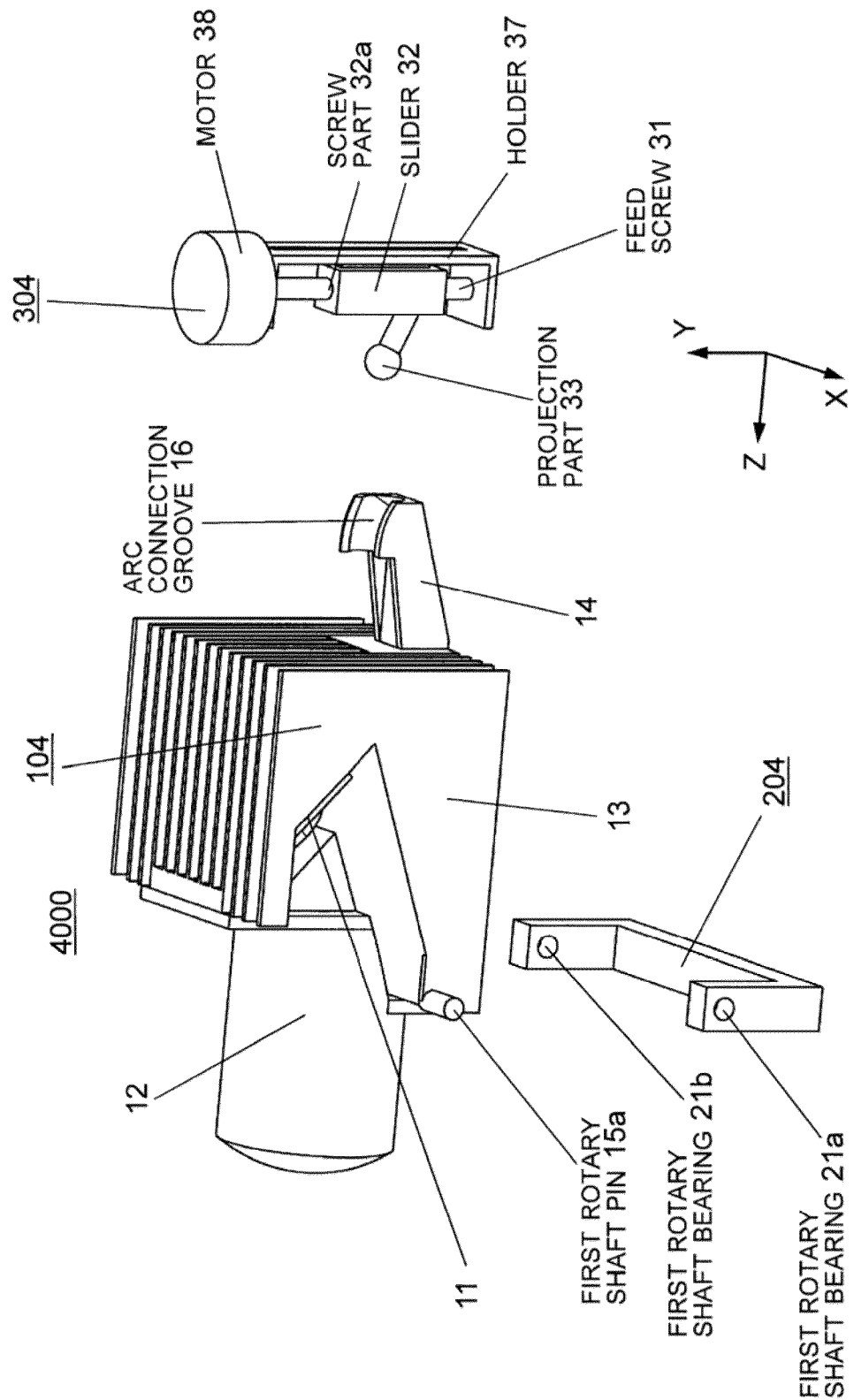
FIG. 16 is an exploded perspective view schematically showing the structure of the headlight device according to the fourth embodiment.

FIG. 14 is a side view schematically showing the structure of a headlight device 4000 according to a fourth embodiment. FIG. 15 is a perspective view schematically showing the structure of the headlight device 4000. FIG. 16 is an exploded perspective view schematically showing the structure of the headlight device 4000. The headlight device 4000 according to the fourth embodiment differs from the above-described headlight devices 1000, 2000 and 3000 in the shape of an arc connection groove 16 of the connection member 14 of an optical module 104, in the shape of a fixation member 204, and in that an adjustment unit 304 is fixed to the fixation member 204.

In the fourth embodiment, the arc connection groove 16 as the connection groove of the connection member 14 of the optical module 104 is a groove having a cross-sectional shape like a C-shape, extending substantially in the ±Z-axis direction like an arc, and pointing obliquely downward as it approaches the adjustment unit 304. Namely, the shape of a cross section of the arc connection groove 16 on a plane parallel to the XY plane is the C-shape, and the shape of the groove in its lengthwise direction is an arc-like shape. Further, the projection part 33 fixed to the slider 32 of the adjustment unit 304 is fitted in the arc connection groove 16.

In the headlight devices 1000, 2000 and 3000 described earlier, the holder 37 is provided with the second rotary shaft pins 35*a* and 35*b*, the fixation member 201, 202, 203 is provided with the second rotary shaft bearings 23*a* and 23*b*, and the adjustment unit 301, 302, 303 is supported to be freely rotatable with respect to the fixation member 201, 202, 203 around the X-axis. In contrast, in the headlight device 4000 according to the fourth embodiment, the holder 37 of the adjustment unit 304 is fixed to the fixation member 204 and does not rotate with respect to the fixation member 204.

Next, a rotating operation of the headlight device 4000 will be described below. In FIG. 14 to FIG. 16, when the feed screw 31 driven by the motor 38 rotates around the Y-axis and accordingly the slider 32 moves in the +Y-axis direction, for example, the projection part 33 fixed to the slider 32 moves in the +Y-axis direction as the upward direction while being fitted in the arc connection groove 16 provided on the connection member 14. According to module 104 rotates around this movement, the optical the X-axis centering at the first rotary shaft 15 as the rotation center.

When the slider 32 moves in the +Y-axis direction as the upward direction, the optical module 104 rotates around the X-axis (i.e., counterclockwise in FIG. 14) centering at the first rotary shaft 15. When the slider 32 moves in the -Y-axis direction as the downward direction, the optical module 104 rotates around the X-axis (i.e., clockwise in FIG. 14) centering at the first rotary shaft 15. The rotation of the optical module 104 around the first rotary shaft 15 is regulated by the contact point where the arc connection groove 16 and the projection part 33 contact each other.

Here, the inclination amount of the optical module 104 around the X-axis centering at the first rotary shaft 15 is regulated by the X coordinate position of the sphere center of the projection part 33 provided on the slider 32 and the groove shape of the arc connection groove 16 fitted on the projection part 33. Namely, the inclination amount of the optical module 104 around the X-axis centering at the first rotary shaft 15 with respect to the translation amount of the slider 32 in the Y-axis direction can be set arbitrarily by adjusting the groove shape of the arc connection groove 16 fitted on the projection part 33 which corresponds to the cam shape.

Figure 17:
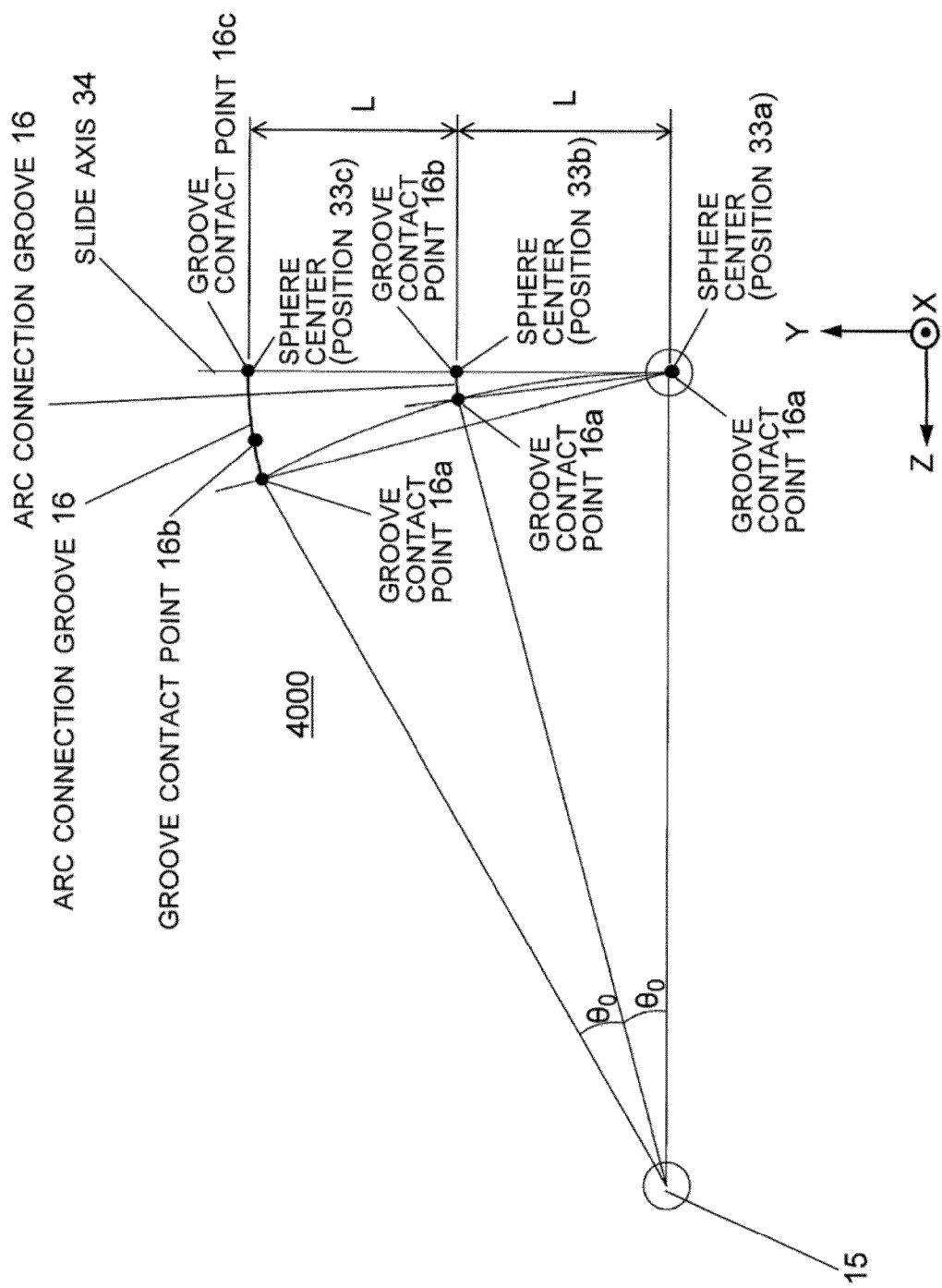
FIG. 17 is a schematic diagram showing the relationship between the rotation of the optical module and the adjustment unit in the headlight device according to the fourth embodiment.

In the case where the inclination amount of the optical module 104 around the X-axis centering at the first rotary shaft 15 is made constant with respect to the constant translation amount of the slider 32 in the Y-axis direction, that is, in the case where the inclination amount of the optical module 104 around the X-axis centering at the first rotary shaft 15 is made linear with respect to the translation amount of the slider 32 in the Y-axis direction, the groove shape of the arc connection groove 16 is configured so that the arc connection groove 16 is constantly in contact with the position of the sphere center of the projection part 33 shown in FIG. 17.

FIG. 17 is a schematic diagram showing a relationship between the rotation of the optical module 104 of the headlight device 4000 and the position of the sphere center of the projection part 33 of the adjustment unit 304. FIG. 17 shows a positional relationship among the first rotary shaft 15, the slide axis 34, the sphere center of the projection part 33 and a groove contact point of the arc connection groove 16 in the headlight device 4000 and its relationship with the rotation angle of the optical module 104. Here, the inclination of the optical module 104 is represented by a line segment connecting the first rotary shaft 15 and the groove contact point 16*a*.

In FIG. 17, when the sphere center of the projection part 33 is at the position 33*a*, the inclination of the optical module 104 is 0 (horizontal). At that time, the arc connection groove 16 is in contact with the projection part 33, having the sphere center situated at the position 33*a*, at the groove contact point 16*a*.

Next, in order to make the optical module 104 incline by the angle $\theta_0$ when the slider 32 (not shown in FIG. 17) moves in the +Y-axis direction by the unit movement amount L along the slide axis 34 and accordingly the sphere center of the projection part 33 moves to the position 33*b*, it is desirable if a groove contact point 16*b* is set at the same position as the position 33*b* of the sphere center and the arc connection groove 16 is configured in a shape smoothly connecting the groove contact point 16*a* and the groove contact point 16*b*.

Further, in order to make the optical module 104 incline by the angle $2\theta_0$ when the slider 32 (not shown in FIG. 17) moves in the +Y-axis direction from the initial position by the movement amount 2L (i.e., twice the unit movement amount L) along the slide axis 34 and accordingly the sphere center of the projection part 33 moves to the position 33c, it is desirable if a groove contact point 16c is set at the same position as the position 33c of the sphere center and the arc connection groove 16 is configured to extend so as to smoothly connect the groove contact point 16b and the groove contact point 16c. Namely, the inclination amount of the optical module 104 around the X-axis centering at the first rotary shaft 15 can be made constant with respect to the constant translation amount of the slider 32 in the Y-axis direction if the groove shape of the arc connection groove 16 is configured so as to smoothly connect the groove contact points 16a, 16b and 16c in contact with the positions 33a, 33b and 33c of the sphere center of the projection part 33. Namely, the inclination amount of the optical module 104 around the X-axis centering at the first rotary shaft 15 can be made linear with respect to the translation amount of the slider 32 in the Y-axis direction.

As described above, the rotation angle of the optical module 104 is constant with respect to the unit movement amount L of the slider 32 of the liner movement mechanism of the adjustment unit 304 (namely, the unit movement amount L of the slider 32 and the rotation angle of the optical module 104 are linear with respect to each other), and thus the direction of the optical axis A (i.e., the rotation angle) of the optical module 104 can be adjusted with high resolution.

Further, the manufacture is easy thanks to the simple structure in which the adjustment unit 304 is fixed to and supported by the fixation member 204.

Incidentally, while the arc connection groove 16 in the above description was a groove having a cross-sectional shape like a C-shape obtained by removing a part of a cylindrical groove as a cutout, it is also possible to form the arc connection groove 16 as a cylindrical groove with no notch, and similar effects can be obtained also in that case.

Fifth Embodiment

Figure 18:
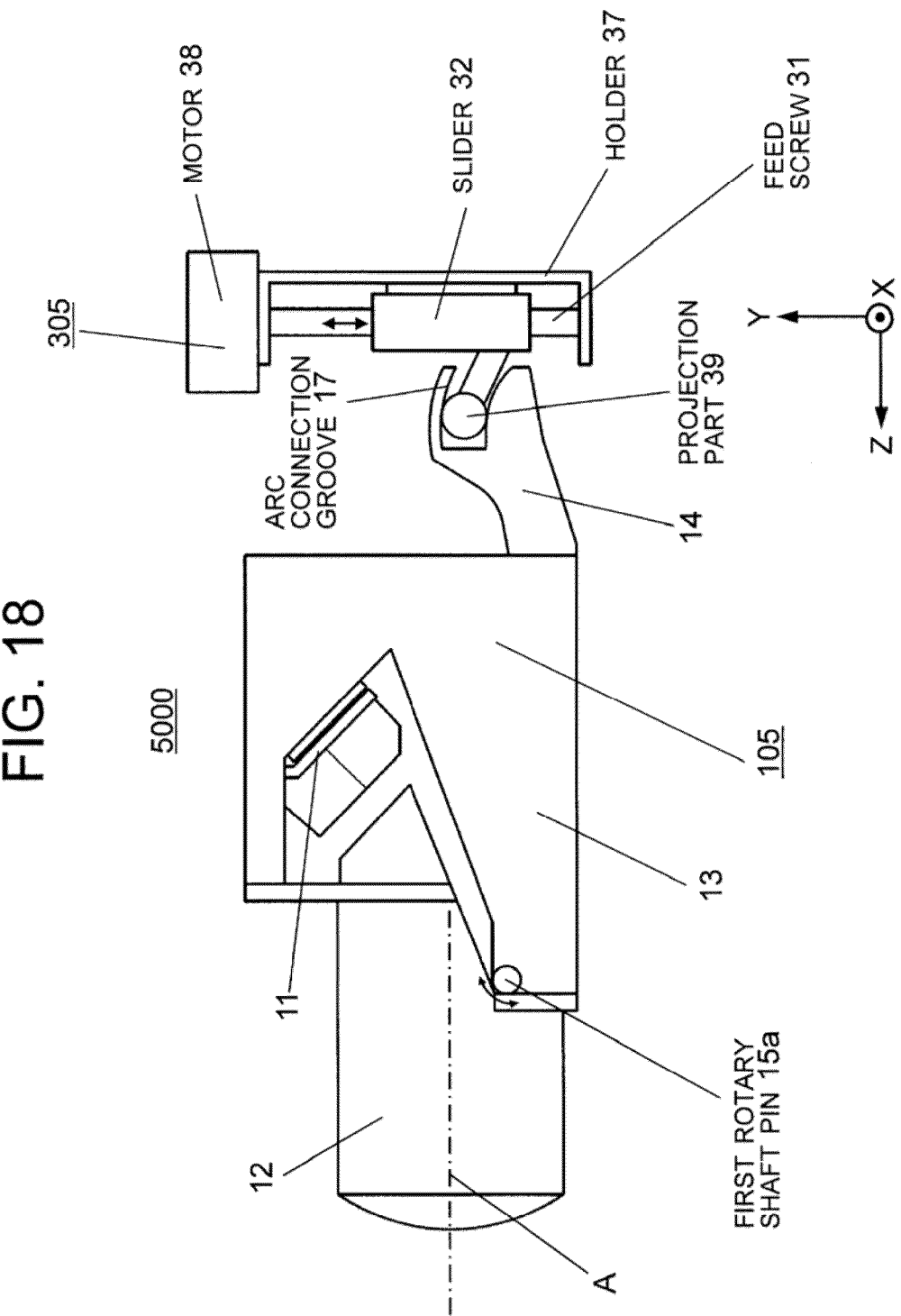
FIG. 18 is a side view schematically showing the structure of a headlight device according to a fifth embodiment.
Figure 19:
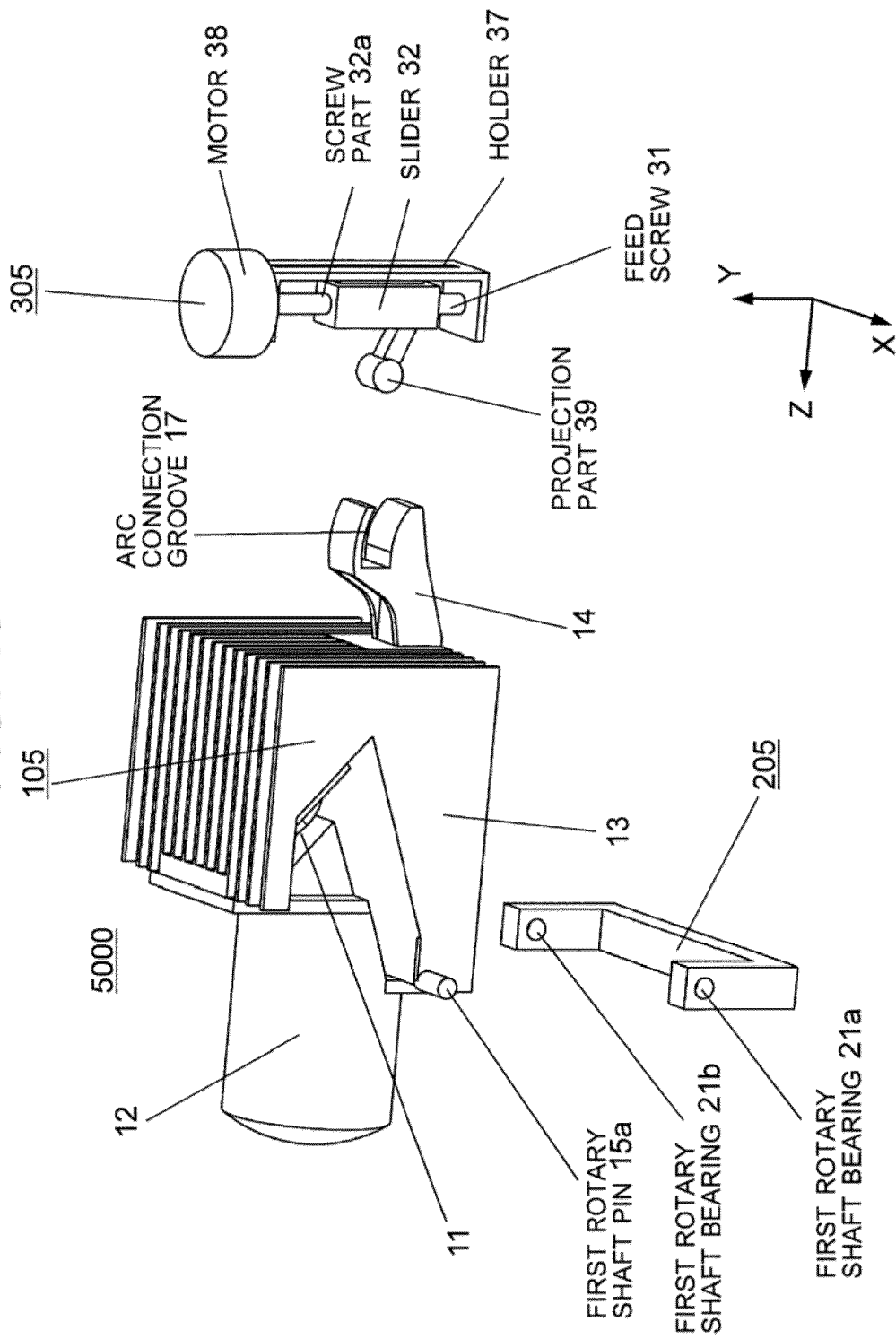
FIG. 19 is an exploded perspective view schematically showing the structure of the headlight device according to the fifth embodiment.

FIG. 18 is a side view schematically showing the structure of a headlight device 5000 according to a fifth embodiment. FIG. 19 is an exploded perspective view schematically showing the structure of the headlight device 5000. The headlight device 5000 according to the fifth embodiment differs from the headlight device 4000 according to the fourth embodiment in the shape of an arc connection groove 17 of the connection member 14 of an optical module 105 and the shape of the projection part 39 of an adjustment unit 305. A fixation member in the fifth embodiment is the same as the fixation member 204 in the fourth embodiment.

While the arc connection groove 16 of the optical module 104 in the fourth embodiment is a groove having a cross-sectional shape like a C-shape and extending substantially in the ±Z-axis direction like an arc, the arc connection groove 17 of the optical module 105 in the fifth embodiment is a groove having a cross-sectional shape like a square U-shape and extending in the ±X-axis direction. Further, while the projection part 33 of the adjustment unit 304 in the fourth embodiment is a spherical body that is rotatably fitted in the arc connection groove 16, the projection part 39 of the adjustment unit 305 in the fifth embodiment is a cylindrical body that is fitted in the arc connection groove 17 to be rotatable and has its axial direction in the X-axis direction. As shown in FIG. 18 and FIG. 19, in the headlight device 5000, the arc connection groove 17 of the optical module 105 has two curved surfaces parallel to the XZ plane and facing each other to sandwich the projection part 39 in the up/down direction.

The headlight device 5000 according to the fifth embodiment operates as shown in FIG. 17 similarly to the headlight device 4000 according to the fourth embodiment.

As described above, the rotation angle of the optical module 105 is constant with respect to the unit movement amount L of the slider 32 of the liner movement mechanism of the adjustment unit 305 (namely, the unit movement amount L of the slider 32 and the rotation angle of the optical module 105 are linear with respect to each other), and thus the direction of the optical axis A (i.e., the rotation angle) of the optical module 105 can be adjusted with high resolution.

Further, the manufacture is easy thanks to the simple structure in which the adjustment unit 305 is fixed to and supported by the fixation member.

Incidentally, except for the above-described features, the fifth embodiment is the same as the fourth embodiment.

DESCRIPTION OF REFERENCE CHARACTERS 104, 105: optical module, 11: light source section, 12: optical member, 13: holding member, 14: connection member, 15: first rotary shaft, 15a, 15b: first rotary shaft pin, 16, 17: arc connection groove, 204: fixation member, 304, 305: adjustment unit, 32: slider, 32b, 32c: slide pin, 33, 39: projection part, 34: slide axis, 37: holder, 38: motor, 4000, 5000: headlight device, A: optical axis.

What is claimed is:

1. A rotation adjustment mechanism comprising:
a rotation target module supported to be freely rotatable with respect to a fixation member around a first rotary shaft; and
an adjustment unit fixed to the fixation member and including a slider movable along a slide axis pointing in a direction orthogonal to the first rotary shaft, wherein
the rotation target module includes a connection groove,
the slider includes a projection part that is fitted in the connection groove,
rotation of the rotation target module around the first rotary shaft is regulated by a contact point where the connection groove and the projection part contact each other, and
a shape of a surface of the connection groove contacting the projection part is a shape formed by a locus that successively connects the contact points of the connection groove and the projection part each of which is obtained each time the rotation target module is moved around the first rotary shaft by a unit angle and simultaneously the projection part fixed to the slider is translated by a constant amount in a direction parallel to the slide axis.

2. The rotation adjustment mechanism according to claim 1, wherein a shape of a cross section of the connection groove on a plane orthogonal to the first rotary shaft is arc-like.

3. The rotation adjustment mechanism according to claim 1, wherein the connection groove has a shape like a C-shape or a circular shape in a side view as viewed in a direction orthogonal to the first rotary shaft.

4. The rotation adjustment mechanism according to claim 2, wherein the projection part is a spherical body.

5. The rotation adjustment mechanism according to claim 1, wherein the connection groove is a groove in a linear shape extending in a direction parallel to the first rotary shaft.

6. The rotation adjustment mechanism according to claim 5, wherein a shape of a cross section of the connection groove on a plane orthogonal to the first rotary shaft is a substantially square U-shape.

7. The rotation adjustment mechanism according to claim 5, wherein the projection part is a cylindrical body having an axis extending in a direction parallel to the first rotary shaft.

8. The rotation adjustment mechanism according to claim 1, wherein the rotation target module includes a light source section and an optical member that changes light distribution of light emitted from the light source section.

9. A headlight device comprising the rotation adjustment mechanism according to claim 1 and the fixation member.

* * * * *